US012092978B2

(12) United States Patent
Someya et al.

(10) Patent No.: US 12,092,978 B2
(45) Date of Patent: Sep. 17, 2024

(54) FIXING DEVICE AND IMAGE FORMING APPARATUS INCORPORATING THE SAME

(71) Applicants: Yukimichi Someya, Saitama (JP); Yuusuke Furuichi, Kanagawa (JP); Tomoya Adachi, Kanagawa (JP); Hiroyuki Shimada, Tokyo (JP)

(72) Inventors: Yukimichi Someya, Saitama (JP); Yuusuke Furuichi, Kanagawa (JP); Tomoya Adachi, Kanagawa (JP); Hiroyuki Shimada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/329,201

(22) Filed: Jun. 5, 2023

(65) Prior Publication Data

US 2023/0408959 A1 Dec. 21, 2023

(30) Foreign Application Priority Data

Jun. 16, 2022 (JP) ................................ 2022-097483

(51) Int. Cl.
*G03G 15/20* (2006.01)

(52) U.S. Cl.
CPC ..... *G03G 15/2053* (2013.01); *G03G 15/2028* (2013.01)

(58) Field of Classification Search
CPC ........... G03G 15/2028; G03G 15/2053; G03G 15/2064
USPC ................................ 399/122, 320, 328–330
See application file for complete search history.

(56) References Cited

U.S. PATENT DOCUMENTS

2013/0209147 A1 8/2013 Ogawa et al.
2013/0236225 A1 9/2013 Ogawa et al.
2020/0285178 A1* 9/2020 Fujiwara ............ G03G 15/2053
2022/0066368 A1* 3/2022 Iwaya ................ G03G 15/2064
(Continued)

FOREIGN PATENT DOCUMENTS

JP 2011-028081 2/2011
JP 2013-186259 9/2013
(Continued)

OTHER PUBLICATIONS

U.S. Appl. No. 18/060,566, filed Nov. 30, 2022, Yuusuke Furuichi, et al.

*Primary Examiner* — Hoan H Tran
(74) *Attorney, Agent, or Firm* — Harness, Dickey and Pierce, P.L.C.

(57) ABSTRACT

A fixing device includes a first rotator, a second rotator, a heater, a nip formation pad, and a separator. The second rotator contacts an outer circumferential surface of the first rotator to form a nip between the first rotator and the second rotator. The heater includes a resistive heat generator to heat the first rotator. The nip formation pad contacts an inner circumferential surface of the first rotator to form the nip. The separator separates a recording medium passing through the nip from the first rotator. The separator includes a separating surface and a contact. The separating surface is separated from the outer circumferential surface of the first rotator and separates the recording medium from the first rotator. The contact contacts the outer circumferential surface of the first rotator at a position where the first rotator is pinchable between the contact and the nip formation pad.

17 Claims, 20 Drawing Sheets

(56) References Cited

U.S. PATENT DOCUMENTS

| | | | |
|---|---|---|---|
| 2022/0179338 | A1 | 6/2022 | Seshita et al. |
| 2022/0283530 | A1 | 9/2022 | Adachi et al. |
| 2022/0291610 | A1 | 9/2022 | Seki et al. |
| 2022/0299919 | A1 | 9/2022 | Inoue et al. |
| 2022/0299920 | A1 | 9/2022 | Shimada et al. |
| 2022/0308511 | A1 | 9/2022 | Someya et al. |
| 2022/0357697 | A1 | 11/2022 | Furuichi |
| 2022/0382191 | A1 | 12/2022 | Furuichi et al. |
| 2022/0382192 | A1 | 12/2022 | Inoue et al. |
| 2022/0390894 | A1 | 12/2022 | Saito et al. |
| 2023/0004108 | A1 | 1/2023 | Furuichi et al. |
| 2023/0010218 | A1 | 1/2023 | Shoji et al. |
| 2023/0063779 | A1 | 3/2023 | Shimada et al. |
| 2023/0081075 | A1 | 3/2023 | Someya et al. |
| 2023/0110956 | A1 | 4/2023 | Furuichi |

FOREIGN PATENT DOCUMENTS

| | | |
|---|---|---|
| JP | 2013-186394 | 9/2013 |
| JP | 2014-106520 | 6/2014 |
| JP | 2023-069406 | 5/2023 |

* cited by examiner

FIXING DEVICE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2022-097483, filed on Jun. 16, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

An electrophotographic image forming apparatus such as a copier or a printer includes a fixing device to fix a toner image onto a recording medium such as a sheet.

The fixing device includes a pair of rotators such as a belt or a roller. The pair of rotators holds and conveys a recording medium and applies heat and pressure to the recording medium to fix the toner image on the recording medium. One type of fixing device includes a separator that separates the recording medium from the rotator. The separator has a leading end close to the surface of the rotator. The recording medium passing through a nip between the pair of rotators comes into contact with the leading end of the separator. As a result, the recording medium is separated from the rotator.

In order to obtain a stable separation function, the separator is preferably positioned to maintain a constant gap between the leading end of the separator and the outer circumferential surface of the rotator. To maintain the constant gap, a part of the separator in the fixing device is brought into contact with the surface of the rotator. This configuration enables the leading end of the separator to follow the fluctuating surface of the rotator even if the position of the surface of the rotator fluctuates with rotation.

SUMMARY

This specification describes an improved fixing device that includes a first rotator, a second rotator, a heater, a nip formation pad, and a separator. The second rotator contacts an outer circumferential surface of the first rotator to form a nip between the first rotator and the second rotator. The heater includes a resistive heat generator to heat the first rotator. The nip formation pad contacts an inner circumferential surface of the first rotator to form the nip. The separator separates a recording medium passing through the nip from the first rotator. The separator includes a separating surface and a contact. The separating surface is separated from the outer circumferential surface of the first rotator and separates the recording medium from the first rotator. The contact contacts the outer circumferential surface of the first rotator at a position where the first rotator is pinchable between the contact and the nip formation pad.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
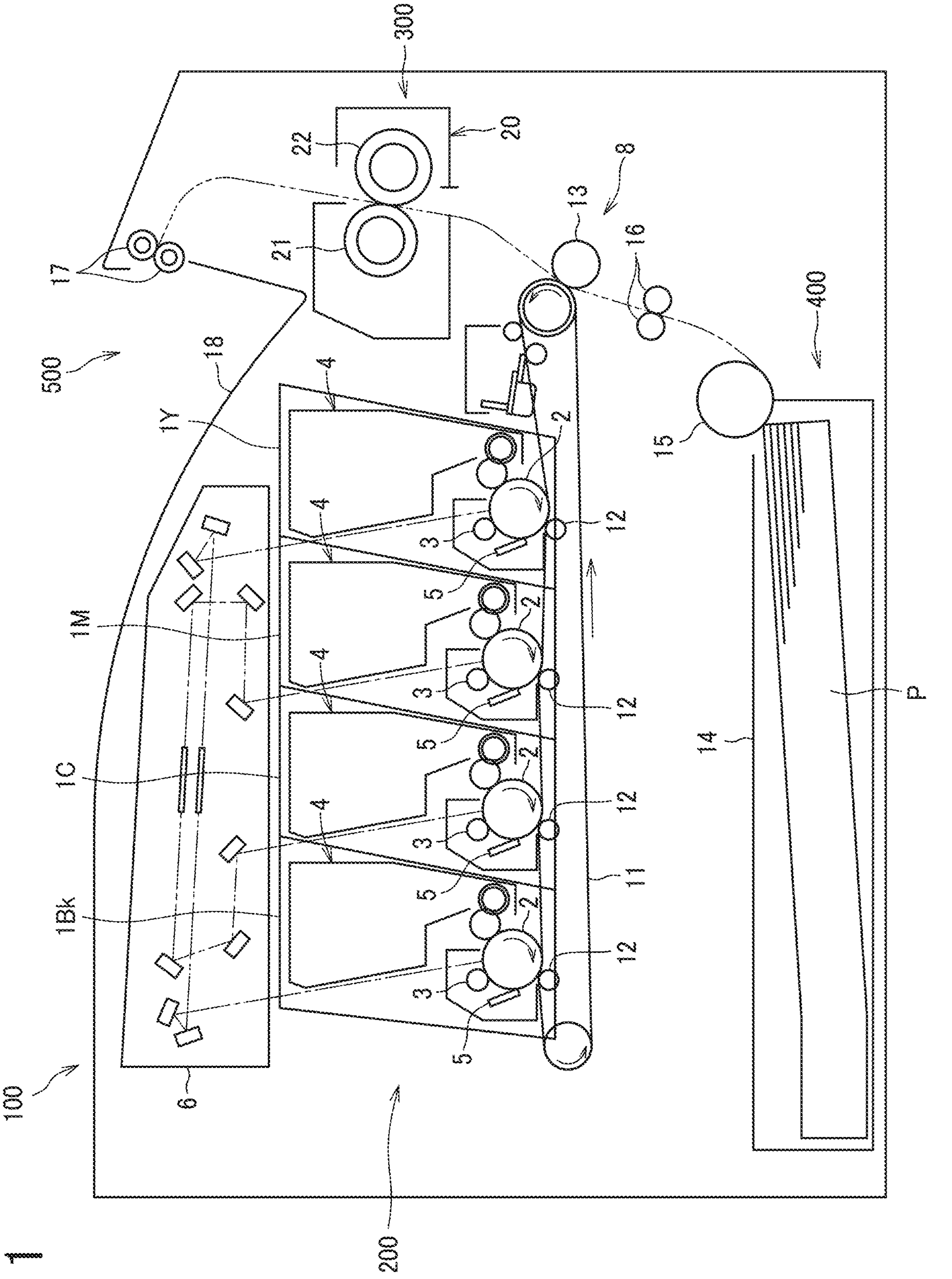
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic cross-sectional view of an image forming apparatus 100 according to an embodiment of the present disclosure. In the following description, the "image forming apparatus" includes a printer, a copier, a scanner, a facsimile machine, or a multifunction peripheral having at least two of printing, copying, scanning, and facsimile functions. The term "image formation" indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of the image forming apparatus 100 according to the embodiment of the present disclosure.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes the photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20. The fixing device 20 includes a fixing belt 21 that is an endless belt and a pressure roller 22 as an opposed rotator opposite to the fixing belt 21. The fixing belt 21 and the pressure roller 22 are in contact with each other at their outer peripheral surfaces to form a nip (that is, a fixing nip).

The recording medium feeder 400 includes a sheet tray 14 to store sheets P as recording media and a feed roller 15 to feed the sheet P from the sheet tray 14. Although a "recording medium" is described as a "sheet of paper" (simply referred to as "sheet") in the following embodiments, the "recording medium" is not limited to the sheet of paper. Examples of the "recording medium" include not only the sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

To provide a fuller understanding of the embodiments of the present disclosure, a description is now given of printing operations of the image forming apparatus 100 according to the present embodiment, with continued reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the process units 1Y, 1M, 1C, and 1Bk, the charger 3 uniformly charges the surface of the photoconductor 2 at a high electric potential. Next, the exposure device 6 exposes the surface (that is, the charged surface) of each photoconductor 2 based on image data of a document read by a document reading device or print image data sent from a terminal that sends a print instruction. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming the toner image thereon. When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 rotated counterclockwise in FIG. 1 successively such that the toner images are superimposed on the intermediate transfer belt 11, forming a full color toner image thereon. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred from the photoconductor 2 onto the intermediate transfer belt 11, the cleaner 5 removes residual toner remained on the photoconductor 2 therefrom.

In accordance with rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the full-color toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording medium ejection section 500. In the recording medium ejection section 500, the output roller pair 17 ejects the sheet P onto the output tray 18. Thus, a series of printing operations is completed.

Next, a configuration of the fixing device according to the exemplary embodiment will be described in detail with reference to FIGS. 2 to 7.

Figure 2:
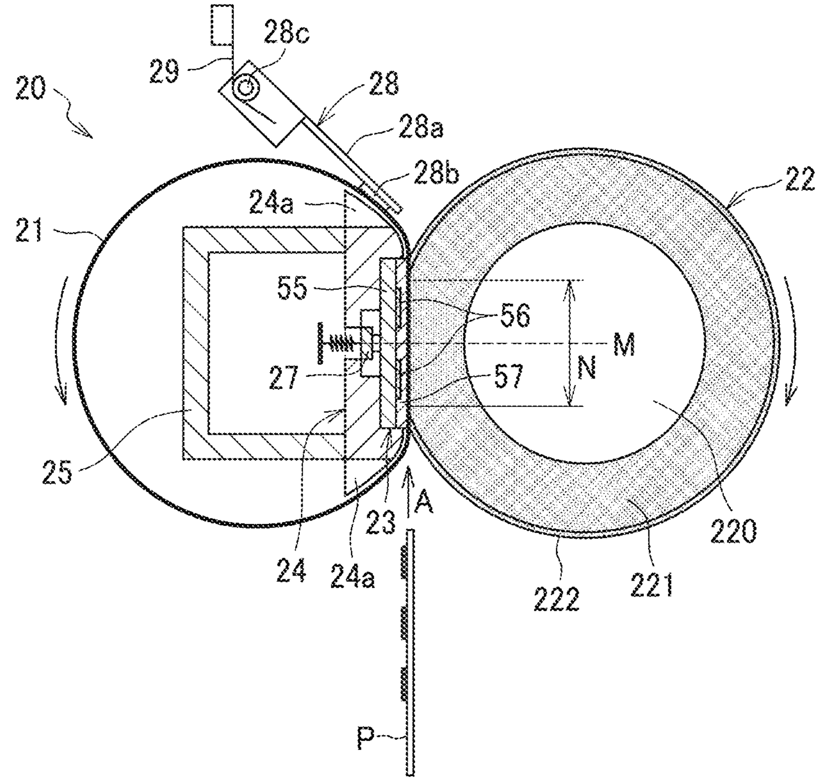
FIG. 2 is a schematic cross-sectional side view of the fixing device according to the embodiment.

As illustrated in FIG. 2, the fixing device 20 according to the present embodiment includes a heater 23, a nip formation pad 24, a stay 25, temperature sensors 27, and a separation plate 28 in addition to the fixing belt 21 and the pressure roller 22.

The fixing belt 21 is a rotator as a first rotator or a fixing rotator to be in contact with a surface of the sheet P bearing an unfixed toner image and fix the unfixed toner image onto the sheet P. The fixing belt 21 is a flexible endless belt. A loop diameter of the fixing belt 21 is in a range of, for example, from 15 mm to 120 mm. In the present embodiment, the fixing belt 21 has an inner diameter of 25 mm.

Figure 5:
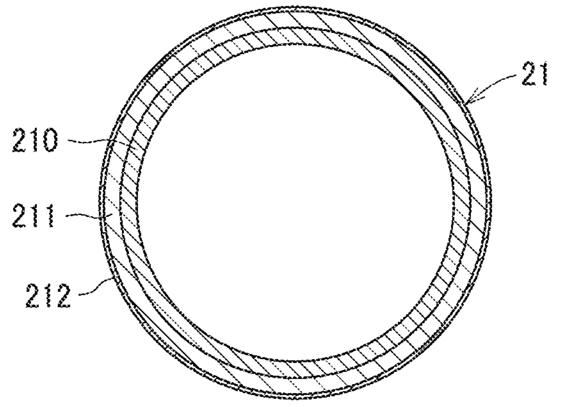
FIG. 5 is a cross-sectional view of a fixing belt according to the embodiment.

As illustrated in FIG. 5, the fixing belt 21 according to the present embodiment includes a base layer 210, an elastic layer 211, and a release layer 212 successively layered from the inner circumferential surface to the outer circumferential surface and has a total thickness set not greater than 1 mm. The base layer 210 has a thickness of from 30 μm to 50 μm and is made of metal, such as nickel or stainless steel, or resin such as polyimide. The elastic layer 211 has a thickness of 100 μm to 300 μm and is made of rubber such as silicone rubber, silicone rubber foam, or fluorine rubber. The elastic layer 211 of the fixing belt 21 absorbs slight surface asperities of the fixing belt 21 at the fixing nip formed between the fixing belt 21 and the pressure roller 22, facilitating even heat conduction from the fixing belt 21 to the color toner image T on the sheet P. The release layer 212 of the fixing belt 21 has a thickness of from 10 μm to 50 μm and is made of material such as tetrafluoroethylene-perfluoroalkylvinylether copolymer (PFA), polytetrafluoroethylene (PTFE), polyimide, polyether imide, and polyether sulfone (PES). The release layer 212 of the fixing belt 21 facilitates the separation of toner contained in the toner image on the sheet P from the fixing belt 21. In other words, the release layer 212 of the fixing belt 21 facilitates the release of the toner from the fixing belt 21.

As illustrated in FIG. 2, the pressure roller 22 is a rotator as a second rotator or the opposed rotator and is disposed to face the outer circumferential surface of the fixing belt 21.

The pressure roller 22 has, for example, an outer diameter of 25 mm and includes a hollow iron core 220, an elastic layer 221 on the outer circumferential surface of the core 220, and a release layer 222 on the outer circumferential surface of the elastic layer 221. The elastic layer 221 has, for example, a thickness of 3.5 mm and is made of silicone rubber or the like. The release layer 222 has, for example, a thickness of about 40 μm and is made of fluororesin or the like.

The heater 23 is a heating member that heats the fixing belt 21. As illustrated in FIG. 2, the heater 23 is disposed inside the loop of the fixing belt 21 and has a contacting surface in contact with the inner circumferential surface of the fixing belt 21.

The heater 23 according to the present embodiment is a planar heater and extends in a longitudinal direction of the fixing belt 21 that is a sheet width direction intersecting a sheet conveyance direction.

Figure 6:
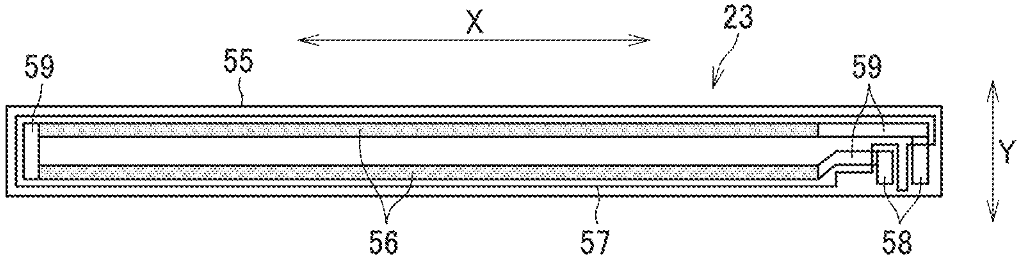
FIG. 6 is a plan view of a heater according to the embodiment.

As illustrated in FIG. 6, the heater 23 includes a base 55 having a planar shape extending in a direction indicated by an arrow X in FIG. 6. The base 55 is disposed so that a longitudinal direction X of the base 55 is in parallel with the longitudinal direction of the fixing belt 21 or an axial direction of the pressure roller 22. On the surface of the base 55, two resistive heat generators 56 extend in the longitudinal direction X of the base 55 and are arranged side by side in a short-side direction Y of the base 55.

The "short-side direction" means a direction orthogonal to the longitudinal direction X along the surface of the base 55 on which the resistive heat generators 56 are disposed and is the same direction as the longitudinal direction of fixing belt 21, the axial direction of the pressure roller 22, and the sheet conveyance direction in which the sheet is conveyed.

As illustrated in FIG. 6, a pair of electrodes 58 are disposed on one end of the base 55 in the longitudinal direction X. Each electrode 58 is coupled to one end of each resistive heat generator 56 via a power supply line 59.

Each resistive heat generator 56 has the other end that is opposite to the one end coupling to each electrode 58. Another power supply line 59 couples the other ends of the two resistive heat generators 56. The insulation layer 57 covers the resistive heat generators 56 and power supply lines 59 to insulate the resistive heat generators 56 and power supply lines 59 from other parts. On the other hand, electrodes 58 are not covered with the insulation layer 57 and are exposed so that a connector as a power supply terminal to be described later can be coupled.

The base 55 is made of a material having excellent heat resistance and insulating properties, such as polyimide, glass, mica, or ceramic such as alumina or aluminum nitride. Alternatively, the base 55 may include a metal plate made of metal (that is a conductive material) such as steel use stainless (SUS), iron, or aluminum and an insulation layer formed on the metal plate. In particular, the base 55 made of a high thermal conductive material such as aluminum, copper, silver, graphite, or graphene improves the thermal uniformity of the heater 23 and image quality. The insulation layer 57 is made of a material having excellent heat resistance and insulating properties, such as polyimide, glass, mica, or ceramic such as alumina or aluminum nitride. The resistive heat generator 56 is, for example, produced as below. Silver-palladium (AgPd), glass powder, and the like are mixed to make paste. The paste is screen-printed on the surface of the base 55. Thereafter, the base 55 is subject to firing. Thus, the resistive heat generator 56 is produced. The material of the resistive heat generator 56 may contain a resistance material, such as silver alloy (e.g., AgPt) or ruthenium oxide ($RuO_2$). The electrodes 58 and the power supply lines 59 are formed by screen-printing silver (Ag) or silver-palladium (AgPd).

Referring back to FIG. 2, the resistive heat generator 56 in the present embodiment is disposed on the surface of the base 55 that is the surface facing the pressure roller 22. Conversely, the resistive heat generator 56 may be disposed on the opposite surface of the base 55 that is the surface opposite to the surface facing the pressure roller 22. In this case, since the heat of the resistive heat generators 56 is transmitted to the fixing belt 21 through the base 55, it is preferable that the base 55 be made of a material with high thermal conductivity such as aluminum nitride.

The nip formation pad 24 is disposed inside the loop of the fixing belt 21 and sandwiches the fixing belt 21 together with the pressure roller 22, to form the nip N. The nip formation pad 24 holds the heater 23 on a surface thereof facing the pressure roller 22. The pressure roller 22 presses the fixing belt 21 against the heater 23, and the nip N is formed between the fixing belt 21 and the pressure roller 22. Since the nip formation pad 24 is subject to temperature increase by heat from the heater 23, the nip formation pad 24 is preferably made of a heat-resistant material. For example, the nip formation pad 24 made of a heat-resistant resin having low heat conductivity, such as a liquid crystal polymer (LCP) or polyether ether ketone (PEEK), has a heat-resistant property and reduces heat transfer from the heater 23 to the nip formation pad 24. As a result, the heater 23 can efficiently heats the fixing belt 21.

As illustrated in FIG. 2, the nip formation pad 24 includes guides **24*a* to guide the fixing belt 21. The guide 24*a* has a cross-sectional shape including an arc along the inner circumferential surface of the fixing belt 21. The guide 24*a* is disposed upstream from the center of the nip N in a sheet passing direction A (a recording medium passing direction) of the sheet P passing through the nip N, and another guide 24*a* is disposed downstream from the center of the nip N in the sheet passing direction A. In the present embodiment, the guides 24*a* are formed integrally with the nip formation pad 24** but may be formed separately.

The stay 25 is a support supporting the nip formation pad 24. The stay 25 supports a stay side face of the nip formation pad 24 extending in the longitudinal direction of the fixing belt 21. The stay side face is opposite a nip side face of the nip formation pad 24. The nip side face faces the pressure roller 22. Accordingly, the stay 25 prevents the nip formation pad 24 and the heater 23 from being bent by a pressing force of the pressure roller 22. As a result, the nip N having a uniform width is formed between the fixing belt 21 and the pressure roller 22. The stay 25 is preferably made of an iron-based metal such as SUS or steel electrolytic cold commercial (SECC) that is electrogalvanized sheet steel to ensure rigidity.

The temperature sensor 27 is a temperature detector that detects the temperature of the heater 23. The temperature sensor 27 may be a known temperature sensor such as a thermopile, a thermostat, a thermistor, or a non-contact (NC) sensor. As illustrated in FIG. 2, the temperature sensor 27 in the present embodiment is disposed so as to be in contact with a surface of the heater 23 opposite a surface of the heater 23 facing the pressure roller 22. The temperature sensor 27 is not limited to the contact type temperature sensor. The temperature sensor 27 may be a non-contact type temperature sensor that is disposed not to be in contact with the heater 23.

The separation plate 28 is disposed downstream from the nip N in the sheet conveyance direction. The separation plate 28 is a separator to separate the sheet P from the surface of the fixing belt 21 after the leading edge of the sheet P passes through the nip N. As illustrated in FIG. 2, the separation plate 28 includes a separation portion **28*a* that is a plate not in contact with the outer circumferential surface of the fixing belt 21, contact portions 28*b* that are contacts in contact with the outer circumferential surface of the fixing belt 21, and a support shaft 28*c* that is attached to a side wall 33 (see FIG. 4**) of the fixing device.

The separation portion **28*a* is the plate disposed close to the surface (the outer circumferential surface) of the fixing belt 21 and downstream from the nip N in the sheet conveyance direction. After the sheet P passes through the nip N, the sheet P comes into contact with the separation portion 28***a* and is separated from the surface of the fixing belt 21 by the separation portion 28*a*. Specifically, the sheet P contacts a separating surface of the separation portion 28*a* and is separated from the surface of the fixing belt 21 by the separating surface. The separation portion 28*a* extends over a range larger than a maximum sheet passing region (in other words, a maximum recording medium passing region) by which a sheet having a maximum width passes so as to be able to separate sheets having various widths. The contact portions 28*b* come into contact with the outer circumferential surface of the fixing belt 21 at positions downstream from the nip N in the sheet passing direction. The support shaft 28*c* is longer than the separation plate 28 in the longitudinal direction of the separation plate 28 and projects from both ends of the separation plate 28 in the longitudinal direction. Alternatively, two support shafts 28*c* may be formed as parts projected from both ends of the separation plate 28 in the longitudinal direction. The support shaft 28*c* is inserted into a hole 33*c* in each of the side walls 33. Inserting the support shafts 28*c* into the holes 33*c* in the side walls 33 enables supporting and moving the separation plate 28 (in particular, a leading end of the separation portion 28*a*) in a direction toward the outer circumferential surface of the fixing belt 21 and a direction away from the outer circumferential surface of the fixing belt 21. As illustrated in FIG. 2, a spring 29 as an urging member such as a torsion spring is attached to the support shaft 28*c*. The spring 29 urges the separation plate 28 toward the outer circumferential surface of the fixing belt 21, so that the contact portion 28*b* is basically held in contact with the outer circumferential surface of the fixing belt 21. The urging member for urging the separation plate 28 into contact with the fixing belt 21 may be a spring such as a torsion spring, a magnet, or another member such as a weight.

Figure 3:
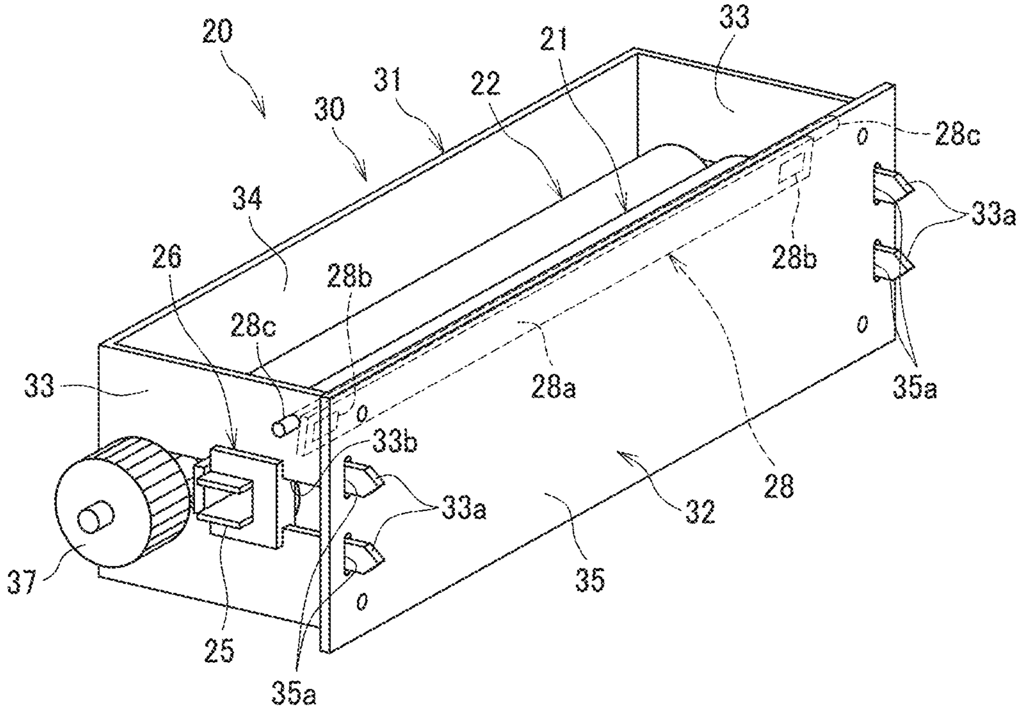
FIG. 3 is a perspective view of the fixing device according to the embodiment.
Figure 4:
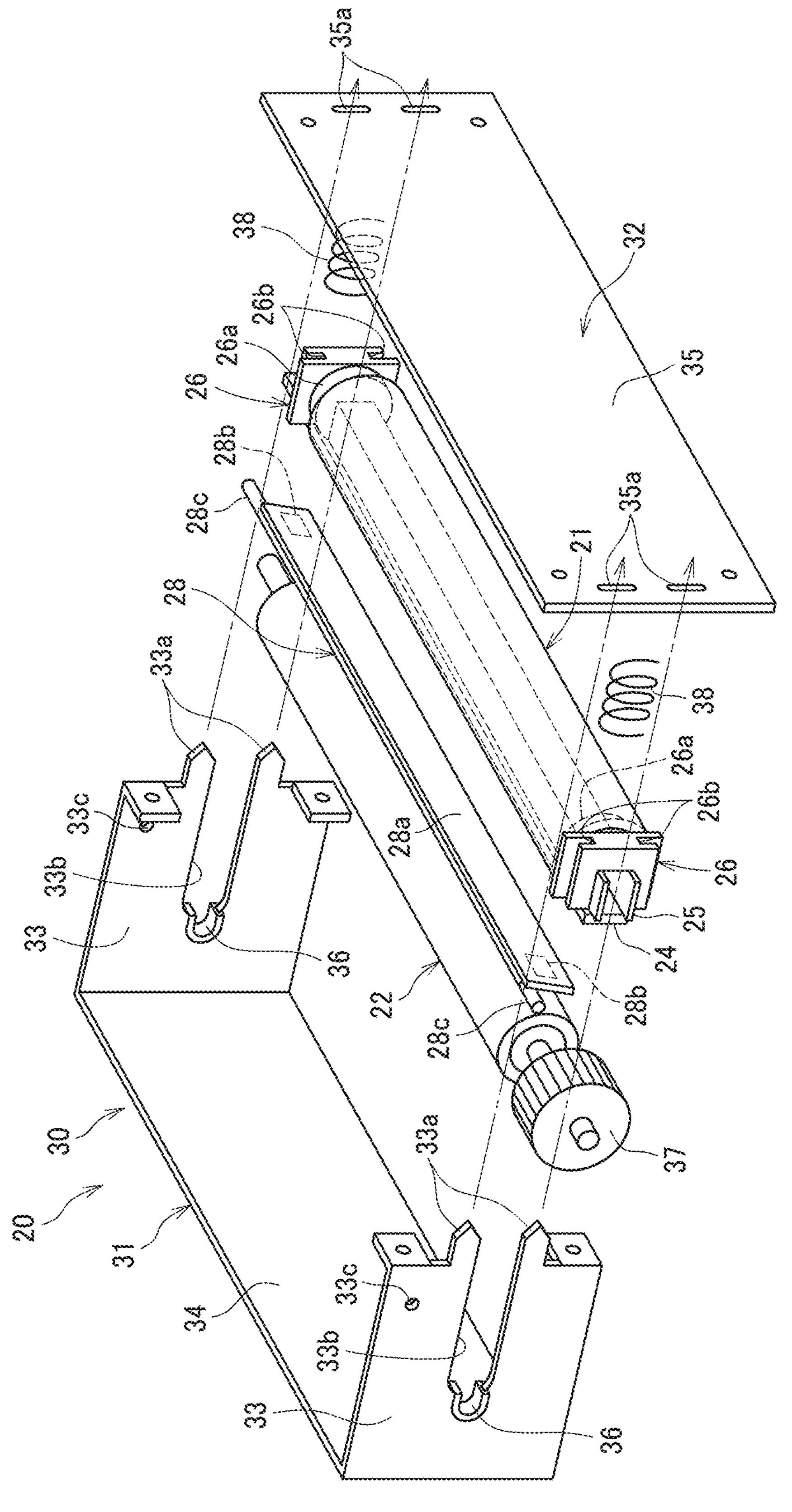
FIG. 4 is an exploded perspective view of the fixing device according to the embodiment.

As illustrated in FIGS. 3 and 4, the fixing device 20 according to the present embodiment includes a frame 30 having a rectangular shape. The frame 30 includes a first frame 31 and a second frame 32. The first frame 31 includes a front wall 34 and a pair of side walls 33 that are configured as one part. The second frame 32 includes a rear wall 35. Each of the pair of side walls 33 includes a plurality of engaging projections 33*a*. As the engaging projections 33*a* engage corresponding engaging holes 35*a* in the rear wall 35, the first frame 31 is coupled to the second frame 32.

The pair of side walls 33 support various components such as the fixing belt 21 and the pressure roller 22. To support the fixing belt 21 and the pressure roller 22, each of the side walls 33 has an insertion slot 33*b* through which a rotation shaft of the pressure roller 22 and the like are inserted. The insertion slot 33*b* opens (toward the rear wall 35) and closes at a portion opposite the rear wall 35, and the portion of the insertion slot 33*b* opposite the rear wall 35 serves as an abutment portion. A bearing 36 that rotatably supports the rotation shaft of the pressure roller 22 is disposed on the abutment portion. A drive transmission gear 37 serving as a driving force transmitting member is disposed at one end of the rotation shaft of the pressure roller 22 in an axial direction thereof. In a state in which the side walls 33 support the pressure roller 22, the drive transmission gear 37 is exposed outside the side wall 33. Accordingly, when the fixing device 20 is installed in the body of the image forming apparatus 100, the drive transmission gear 37 is coupled to a gear disposed in the body of the image forming apparatus 100 so that the drive transmission gear 37 transmits the driving force from the driver to the pressure roller 22. Alternatively, the driving force transmitting member may be pulleys over which a driving force transmission belt is stretched taut, a coupling mechanism, or the like instead of the drive transmission gear 37.

A pair of belt holders 26 (see FIG. 4) as rotator holders that rotatably hold the fixing belt 21 are disposed adjacent to both ends of the fixing belt 21 in the longitudinal direction. Specifically, each of the pair of the belt holders 26 includes a holding portion 26*a* having a cylindrical shape or C-shape and is inserted into the loop of the fixing belt 21. Inserting the holding portions 26*a* into the loops of both ends of the fixing belt 21 rotatably holds the fixing belt 21. Each of the belt holders 26 has a guide groove 26*b*. As illustrated in FIG. 4, the pair of belt holders 26, the fixing belt 21, the stay 25, the nip formation pad 24, and the heater 23 are assembled. Edges of the insertion slot 33*b* in each of the side walls 33 enter into the guide grooves 26*b* of each of the belt holders 26 and slide on the guide grooves 26*b* to set the belt holders 26 in the side walls 33. As a result, side walls 33 support the fixing belt 21, the stay 25, the nip formation pad 24, and the heater 23. The pair of pressure springs 38 as a pressing member is disposed between the belt holders 26 and the rear wall 35 and pushes the belt holders 26 to push the fixing belt 21 toward the pressure roller 22 and form the nip.

Figure 7:
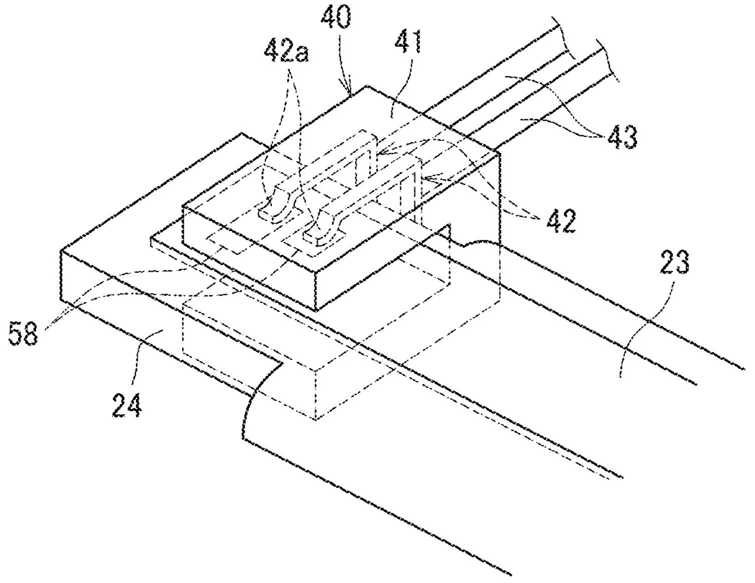
FIG. 7 is a perspective view of a connector as a power supply member coupled to the heater according to the embodiment.

FIG. 7 is a perspective view of a connector 40 as a power supply member coupled to the heater 23.

As illustrated in FIG. 7, the connector 40 includes a housing 41 made of resin, a plurality of contact terminals 42 disposed in the housing 41, and a harness 43 including wires each coupled each contact terminal 42 to supply power. Each contact terminal 42 is configured by an elastically deformable member such as a flat spring.

As illustrated in FIG. 7, the connector 40 is attached to the heater 23 and the nip formation pad 24 such that the connector 40 sandwiches the heater 23 and the nip formation pad 24 together. Thus, the connector 40 holds the heater 23 and the nip formation pad 24 together. In the above-described state, contact portions 42*a* disposed at ends of the contact terminals 42 in the connector 40 elastically contact and press against the electrodes 58 corresponding to the contact terminals 42 to electrically couple to the electrodes 58 and contact terminals 42, respectively. The above-described configuration enables a power supply disposed in a body of the image forming apparatus to supply power to each of the resistive heat generators 56 in the heater 23 via the connector 40.

The fixing device 20 configured as described above operates as follows.

When the image forming apparatus 100 starts the print operations, the driving force is transmitted to the pressure roller 22 via the drive transmission gear 37 to drive and rotate the pressure roller 22. The driving force of the pressure roller 22 is transmitted to the fixing belt 21, and the fixing belt 21 is driven to rotate. Simultaneously, the power source starts supplying power to the heater 23, and the heater 23 generates heat to heat the fixing belt 21. At this time, the temperature sensor 27 detects the temperature of the heater 23, and a controller controls a heat generation amount of the heater 23 based on the detected temperatures so that the fixing belt 21 keeps a temperature (that is, a fixing temperature) that can fix the toner image onto the sheet. As illustrated in FIG. 2, the sheet P bearing the unfixed toner image is conveyed to the nip N between the fixing belt 21 and the pressure roller 22, and the fixing belt 21 and the pressure roller 22 apply heat and pressure to the sheet P to fix the unfixed toner image onto the sheet P.

After the sheet P onto which the toner image is fixed passes through the nip N between the fixing belt 21 and the pressure roller 22, the sheet P comes into contact with the separation plate 28. As a result, the sheet P is separated from the fixing belt 21 and ejected from the fixing device 20. Specifically, a leading edge of the sheet P comes into contact with the leading end of the separation portion 28*a* of the separation plate 28, and the sheet P is conveyed along the separation portion 28*a* and separated from the outer circumferential surface of the fixing belt 21.

Figure 8:
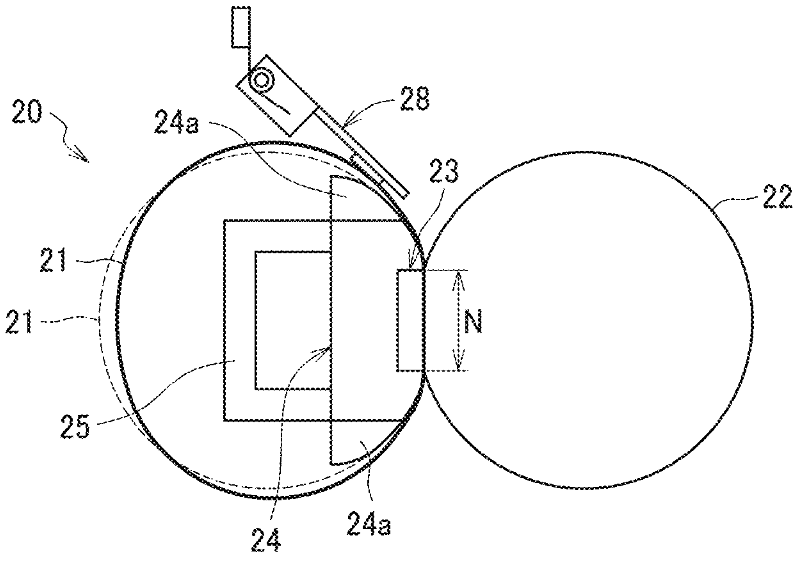
FIG. 8 is a view for illustrating deformation of a fixing belt.

Since the fixing belt 21 is flexible, the fixing belt 21 is basically deformable at portions other than the nip N. Therefore, after the fixing belt 21 stops rotating, the fixing belt in a stationary state deforms so as to expand in a vertical direction in FIG. 8 as illustrated by a solid line in FIG. 8. On the other hand, after the elapse of a sufficient time since the fixing belt 21 starts rotating and is heated, the fixing belt 21 has a shape close to a circular shape as indicated by a broken line in FIG. 8. That is, after the fixing belt 21 starts rotating, the shape of the fixing belt 21 gradually changes from the deformed state in the stationary state to a stable circular shape as time elapses.

As described above, the rotational trajectory of the fixing belt 21 changes when the fixing belt 21 shifts from the stationary state to the normal rotation state. The above-described change in a rotational trajectory of the fixing belt 21 changes a clearance between the separation plate 28 and the fixing belt 21, which may affect the stable separation function of the separation plate 28. Therefore, the separation plate 28 in the present embodiment has the contact portions 28*b* in contact with the outer circumferential surface of the fixing belt 21.

The contact portion 28*b* of the separation plate 28 follows the change in the rotational trajectory of the fixing belt 21 and displaces so as to keep the constant clearance between the fixing belt 21 and the leading end of the separation portion 28*a* of the separation plate 28, which provides the stable separation function. Since the contact portions 28*b* in the present embodiment are on both ends of the separation plate 28 in the longitudinal direction (see FIGS. 3 and 4), each of the contact portions 28*b* displaces so as to follow the change in the rotational trajectory of each of both ends of the fixing belt 21 in the longitudinal direction. However, since the change in the rotational trajectory of the fixing belt 21 occurs in the same manner over the entire longitudinal region of the fixing belt 21, the contact portions 28*b* that follow the change in the rotational trajectories of both ends of the fixing belt 21 enable the separation plate 28 to follow the change in the rotational trajectory of the center of the fixing belt 21 and stabilize the separation function of the separation plate 28.

When the sheet is jammed in the fixing device during the fixing process, the controller stops driving of the image forming apparatus including the fixing device, and an operator such as a service person or a user removes the jammed sheet. During the above-described process removing the jammed sheet, if the operator presses the separation plate hard by mistake, the contact portion of the separation plate may be pushed into the surface of the fixing belt to damage the surface of the fixing belt.

In the fixing device according to the present embodiment, the following measures are taken to prevent the above-described damage of the fixing belt caused by the separation plate pushed into the fixing belt.

Figure 9:
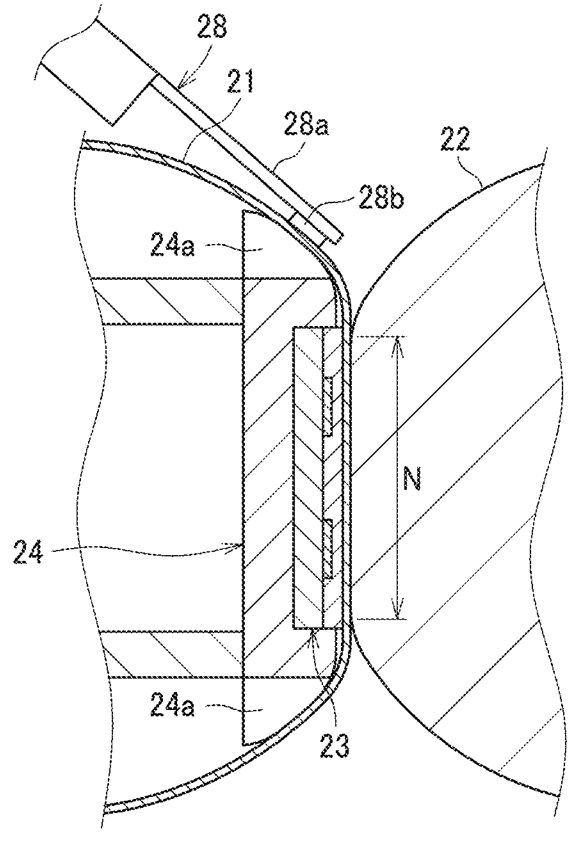
FIG. 9 is a schematic view of a configuration to prevent a separation plate from strongly pushing a fixing belt.

FIG. 9 is a schematic view of a configuration according to the present embodiment to prevent the separation plate 28 from pushing into the fixing belt 21.

As illustrated in FIG. 9, the contact portion 28*b* of the separation plate 28 according to the present embodiment is disposed at a contactable position at which the contact portion 28*b* can come into contact with the nip formation pad 24 via the fixing belt 21. The above-described "contactable position" means a position at which the contact portion 28*b* of the separation plate 28 that displaces toward the fixing belt 21 (in other words, displaces inward in a radial direction of the fixing belt 21). can be in contact with the nip formation pad 24 via the fixing belt 21. Therefore, the contact portion 28*b* at the contactable position may not always be in contact with the nip formation pad 24 via the fixing belt 21. For example, while a clearance is formed between the inner circumferential surface of the rotating fixing belt 21 and the nip formation pad 24, the contact portion 28*b* at the contactable position may not be in contact with the nip formation pad 24 via the fixing belt 21 (see FIG. 8).

In the present embodiment, the guide 24*a* of the nip formation pad 24 is disposed at a position facing the contact portion 28*b* of the separation plate 28 via the fixing belt 21. Therefore, the contact portion 28*b* of the separation plate 28 displacing toward the fixing belt 21 comes into contact with the fixing belt 21 on the guide 24*a* of the nip formation pad 24.

Figure 10:
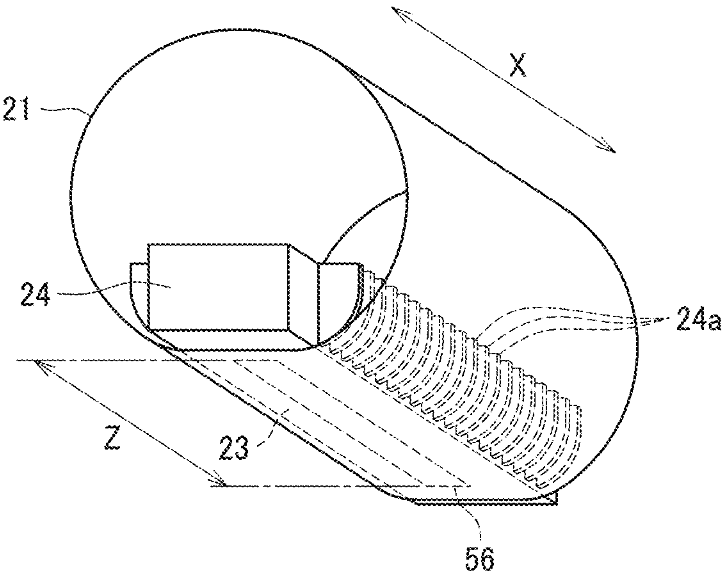
FIG. 10 is a perspective view of a nip formation pad including guides according to the embodiment.

As illustrated in FIG. 10, the nip formation pad 24 in the present embodiment includes multiple guides 24*a* arranged at equal intervals in the longitudinal direction of the fixing belt 21 (that is, the direction indicated by the arrow X). In the above-described configuration, the contact portion 28*b* is disposed at the contactable position at which the contact portion 28*b* comes into contact with the fixing belt on at least one of the guides 24*a* (see FIG. 11). Alternatively, the contact portion 28*b* may be formed to be larger than the interval D (see FIG. 11) between the adjacent guides 24*a* so that the contact portion 28*b* comes into contact with two or more guides 24*a* via the fixing belt.

As described above, the contact portion 28*b* of the separation plate 28 according to the present embodiment is disposed at the contactable position at which the contact portion 28*b* can come into contact with the nip formation pad 24 via the fixing belt 21. Therefore, even when the operator strongly presses the separation plate 28 against the fixing belt 21 by mistake during the process removing the jammed sheet, the contact portion 28*b* comes into contact with the nip formation pad 24 via the fixing belt 21. In other words, the separation plate 28 is supported by the nip formation pad 24. The above-described configuration that prevents the separation plate 28 from being pushed into the fixing belt 21 can prevent the damage of the fixing belt 21 caused by the separation plate 28 pushed into the fixing belt 21.

The above-described configuration in the present embodiment can more easily ensure the strength of the portion supporting the separation plate 28 (that is, the guides 24*a*) than a configuration in which the arm-shaped regulator projecting from a flange supports the separation plate. In the present embodiment, the guide 24*a* receives a load from the separation plate 28, and the load is received by the main body of the nip formation pad 24 that is a portion holding the heater 23. Accordingly, the guide 24*a* is less likely to be damaged or deformed. As a result, the configuration according to the present embodiment can more reliably prevent the separation plate 28 from being pushed into the fixing belt 21.

Since the configuration according to the present embodiment uses the nip formation pad 24 that is an existing component to prevent the separation plate 28 from being pushed into the fixing belt 21, the configuration according to the present embodiment does not need to add a new member.

Therefore, the configuration according to the present embodiment can prevent the damage of the fixing belt 21 caused by the separation plate 28 pushed into the fixing belt 21 at low cost.

The material for the separation plate 28 is not particularly limited and may be, for example, resin or metal. However, since the contact portion 28*b* of the separation plate 28 comes into contact with the outer circumferential surface of the fixing belt 21, the contact portion is preferably made of an elastic material. The contact portion 28*b* (in particular, a contact surface) made of the elastic material can reduce wear of the outer circumferential surface of the fixing belt 21 that is caused by contact with the contact portion 28*b*, which extends the life of the fixing belt 21. The contact portion 28*b* made of the elastic material and pressed against the nip formation pad 24 can disperse the pressing load and prevent the fixing belt 21 from being dented. Examples of the elastic material used for the contact portion 28*b* include foamed materials such as resins and nonwoven fabrics, and an elastic material having a small friction coefficient is preferable.

Figure 11:
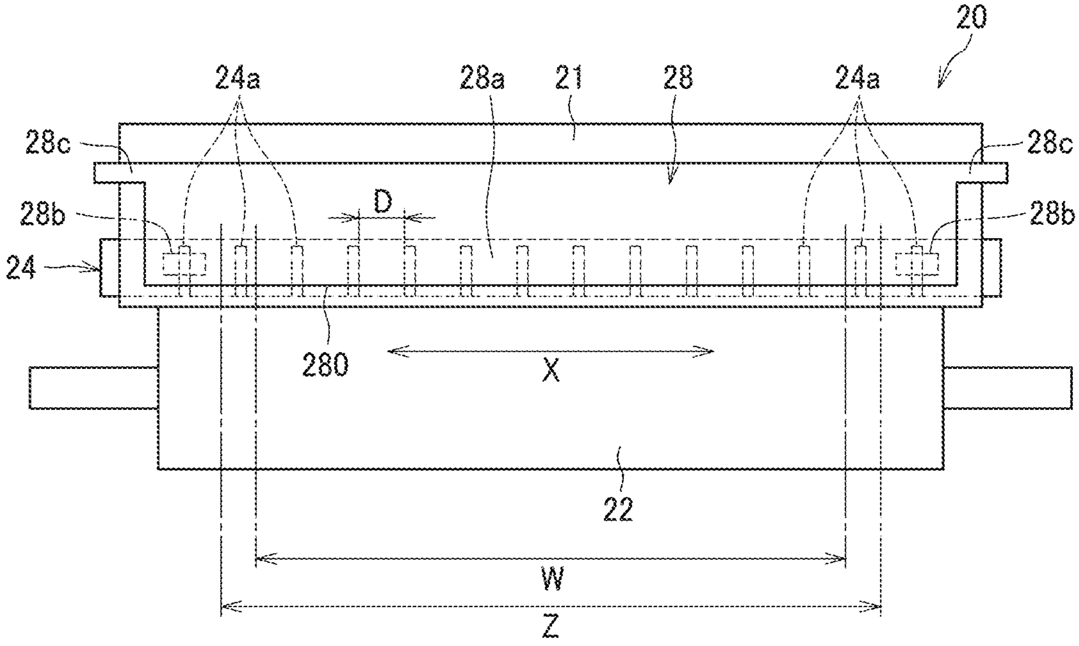
FIG. 11 is a plan view of the separation plate, the fixing belt, the nip formation pad, and a pressure roller to illustrate positions of contact portions of the separation plate according to the present embodiment.

In addition, the contact portion 28*b* is preferably in contact with a non-passing region of the outer circumferential surface of the fixing belt 21. The non-passing region is a region by which the recording medium does not pass and a non-sheet-passing region in the present embodiment by which the sheet does not pass. In FIG. 11, the non-sheet-passing region is outside a sheet passing region (a recording medium passing region) W. The sheet passing through the fixing device 20 is conveyed on the sheet passing region W. Bringing the contact portion 28*b* into contact with the non-sheet-passing region of the outer circumferential surface of the fixing belt 21 can avoid wear and damage of the sheet-passing region of the outer circumferential surface of the fixing belt 21 and prevent occurrence of fixing failure such as image unevenness. In the fixing device 20 through which various sheets having different widths can pass, the contact portion 28*b* is preferably disposed to be in contact with the non-sheet-passing region outside the maximum sheet passing region of the outer circumferential surface of the fixing belt 21.

The contact portion 28*b* is preferably disposed over a position at which the inner circumferential surface of the rotating fixing belt 21 does not come into contact with the nip formation pad 24. The above-described configuration can reduce the wear of the fixing belt 21 caused by the contact of the inner circumferential surface of the fixing belt 21 with the nip formation pad 24, extend the life of the fixing belt 21, and prevent the occurrence of the image failure caused by the fixing unevenness in the worn portion and the other portion of the fixing belt 21.

As illustrated in FIG. 11, the contact portion 28*b* is preferably disposed on a region of the outer circumferential surface of the fixing belt 21 outside a region Z of the heater 23 in which the resistive heat generators 56 are arranged in the longitudinal direction of the fixing belt 21 (see FIG. 10). The above-described configuration can avoid occurrence of heat transfer from the fixing belt 21 to the separation plate 28 via the contact portion 28*b* adjacent to the region Z in which the resistive heat generators 56 heat the fixing belt 21. Therefore, the above-described configuration can prevent occurrence of fixing failure due to local temperature drop of the fixing belt 21.

Figure 12:
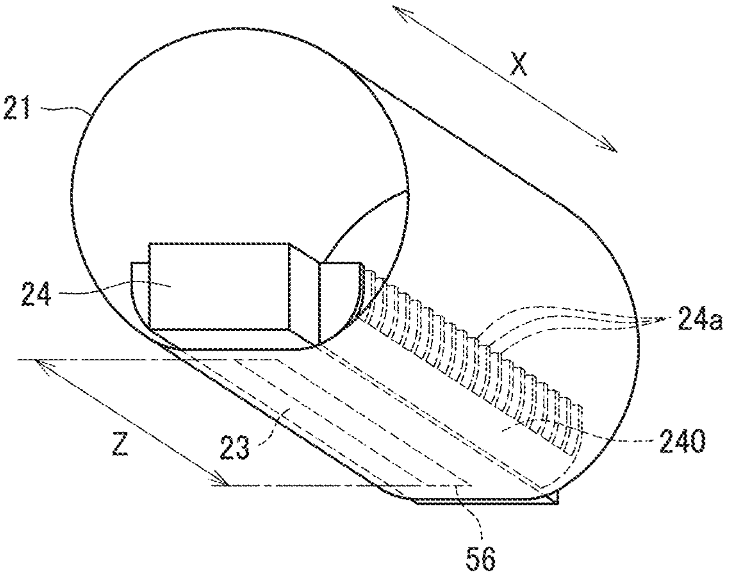
FIG. 12 is a perspective view of the nip formation pad including a guide having a continuous flat surface extending over a longitudinal direction of the fixing belt.

The contact portion 28*b* of the separation plate 28 in the above-described embodiment is in contact with at least one of the multiple guides 24*a* of the nip formation pad 24 via the fixing belt 21. Alternatively, as illustrated in FIG. 12, the nip formation pad 24 may have a continuous curved surface portion 240 extending in the longitudinal direction of the fixing belt 21 indicated by the arrow X in FIG. 12. The curved surface portion 240 is disposed downstream from the multiple guides 24*a* in a rotation direction of the fixing belt 21 and has higher flatness than the multiple guides 24*a*. In other words, the nip formation pad 24 may have the curved surface portion 240 as a contact surface that is longer than one of the multiple guides 24*a* in the longitudinal direction of the fixing belt 21. The nip formation pad 24 may have two curved surface portions 240 opposite the contact portions 28*b*, and multiple guides 24*a* may be disposed between the two curved surface portions similar to the guides 24*a* illustrated in FIGS. 10 and 11. The curved surface portion 240 is preferably larger than the contact portion 28*b* so as to cover the contact portion 28*b*. The contact portion 28*b* may be brought into contact with the curved surface portion 240. In the above-described configuration, the inner circumferential surface of the fixing belt 21 on a portion in which the contact portion 28*b* is in contact with the fixing belt 21 does not come into contact with the edge of the guide 24*a*. Therefore, the above-described configuration can reduce the wear and damage of the fixing belt 21 due to contact with the edge.

Figure 13:
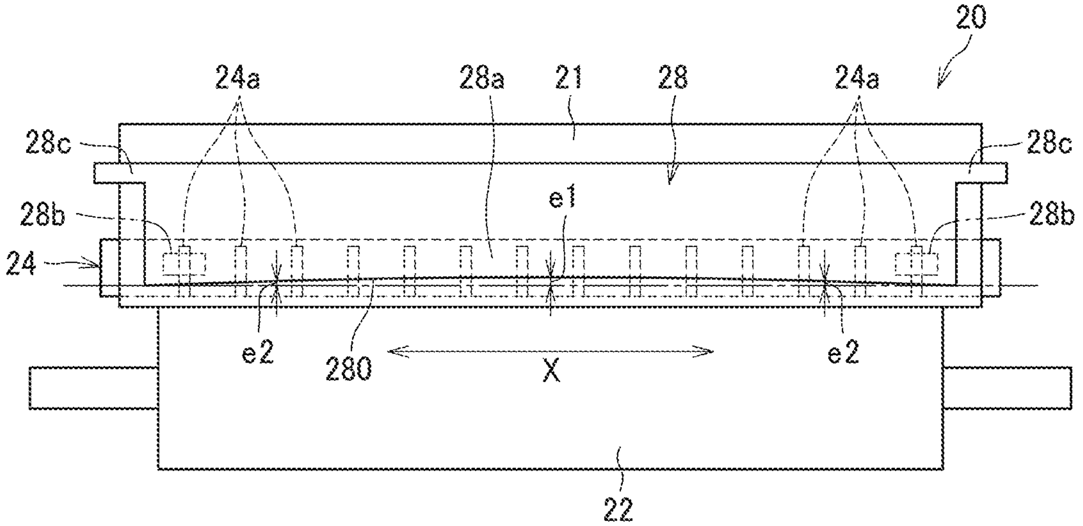
FIG. 13 is a plan view of the fixing belt, the nip formation pad, the pressure roller, and the separation plate having a leading end closer to the fixing belt at both ends than at the center.

The clearance between the leading end of the separation portion 28*a* of the separation plate 28 and the outer circumferential surface of the fixing belt 21 is constant over the longitudinal direction of the fixing belt 21 in FIG. 11 but may be changed as illustrated in FIG. 13. In an embodiment illustrated in FIG. 13, the leading end 280 of the separation portion 28*a* has a recessed curve. The recessed curve has both ends closer to the outer circumferential surface of the fixing belt 21 than the center in the longitudinal direction of the fixing belt 21 that is indicated by the arrow X. In the above-described embodiment, the leading end 280 has a first clearance e1 between the outer circumferential surface of the fixing belt 21 and the leading end 280 of the separation portion 28*a* at a center of the fixing belt 21 in a longitudinal direction of the fixing belt 21 and a second clearance e2 between the outer circumferential surface of the fixing belt 21 and the leading end 280 of the separation portion 28*a* at both ends of the fixing belt 21 in the longitudinal direction, and the second clearance e2 is smaller than the first clearance e1 (that is, $e1>e2$ in FIG. 13). In general, both ends of the sheet tend to be more difficult to separate from the fixing belt 21 than the center of the sheet in the longitudinal direction of the fixing belt 21. Therefore, as in the embodiment illustrated in FIG. 13, setting both ends of the leading end of the separation portion 28*a* in the longitudinal direction to be close to the fixing belt 21 (in other words, setting the second clearance e2 to be smaller than the first clearance e1) can improve the separation of both ends of the sheet from the fixing belt 21.

Figure 14:
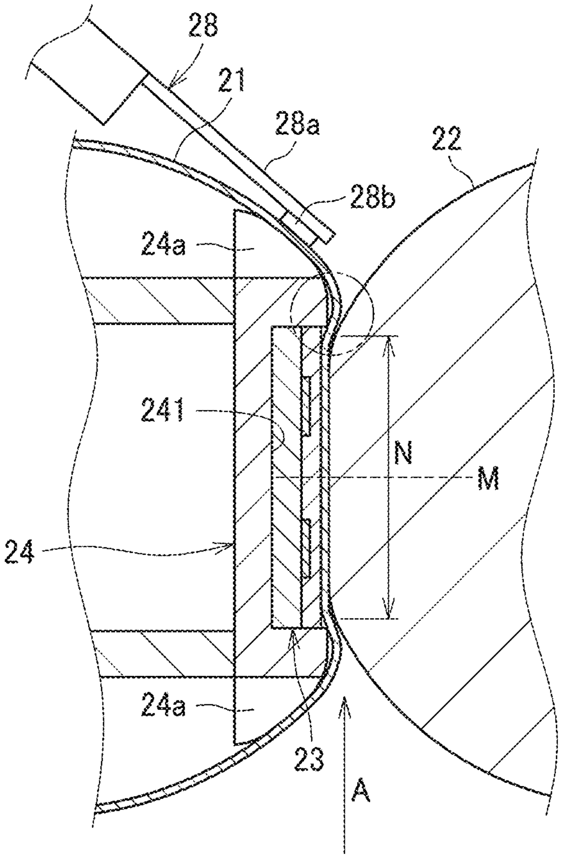
FIG. 14 is a schematic view to illustrate the nip formation pad having projections projecting from a heater toward the pressure roller.

In order to improve the separation of the sheet from the fixing belt 21, the nip formation pad 24 may have a projection projected in a direction from the heater 23 toward the pressure roller 22 as illustrated in FIG. 14 (particularly, a portion surrounded by a circular frame in FIG. 14). In this embodiment, a recessed portion 241 of the nip formation pad 24 to hold the heater 23 has a depth larger than the thickness of the heater 23 and an opening edge (the portion surrounded by the circular frame) that projects in the direction from the heater 23 toward the pressure roller 22. The above-described configuration deforms the trajectory of the fixing belt 21 so as to bulge toward the pressure roller 22 (in other words, so as to increase the curvature) in a portion downstream from the center M of the nip N in the sheet passing direction A. As a result, the sheet is easily separated from the fixing belt 21.

Figure 15:
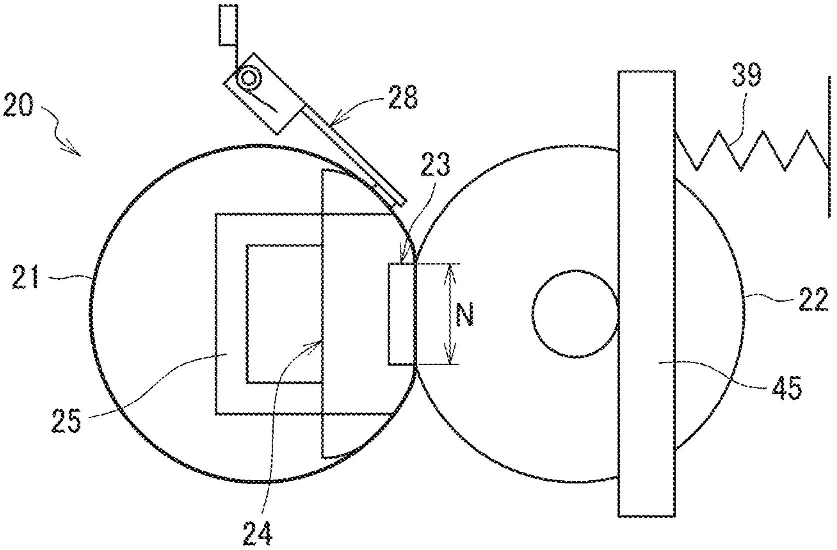
FIG. 15 is a schematic view of a structure pressing the pressure roller against the fixing belt.

In the first embodiment, the pressure springs 38 push the fixing belt 21 against the pressure roller 22 as illustrated in FIG. 4. Conversely, the pressure roller 22 may be pressed against the fixing belt 21. For example, as illustrated in FIG. 15, pressure springs 39 as pressing members and pressure levers 45 may press the pressure roller 22 against the fixing belt 21. In the above-described configuration in which the pressure roller 22 is pressed against the fixing belt 21, the position of the nip formation pad 24 and the position of the heater 23 are fixed. Therefore, the position of the fixing belt 21 is stabilized. Accordingly, the relative positional relationship between the fixing belt 21 and the separation plate 28 is also stabilized, and thus the separation function of the separation plate 28 is also easily stabilized.

Figure 16:
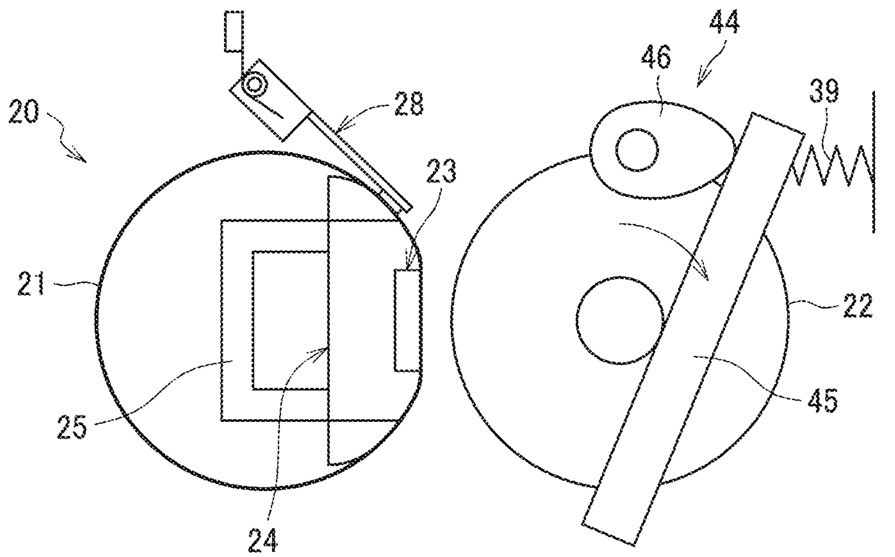
FIG. 16 is a schematic view of a pressure release mechanism to release pressure contact between the fixing belt and the pressure roller.

As illustrated in FIG. 16, the fixing device 20 may include a pressure release mechanism 44 that releases the pressure contact between the fixing belt 21 and the pressure roller 22. In this case, rotating cams 46 push and move the pressure levers 45 in a direction opposite to the pressing direction to release the pressure contact between the fixing belt 21 and the pressure roller 22. Keeping the pressure contact between the fixing belt 21 and the pressure roller 22 causes compression set in an elastic layer of the pressure roller 22 and plastic deformation of the fixing belt 21. The above-described pressure release mechanism 44 can prevent the compression set in the elastic layer of the pressure roller 22 and the plastic deformation of the fixing belt 21. Releasing the pressure contact between the fixing belt 21 and the pressure roller 22 when the sheet is jammed facilitates a work to remove the sheet nipped in the nip N.

In the above-described embodiments, the separation plate 28 is brought into contact with the nip formation pad 24 holding the heater 23. However, the present disclosure is also applicable to a fixing device 60 including a nip formation pad 24 that does not hold a heater as illustrated in FIG. 17.

Figure 17:
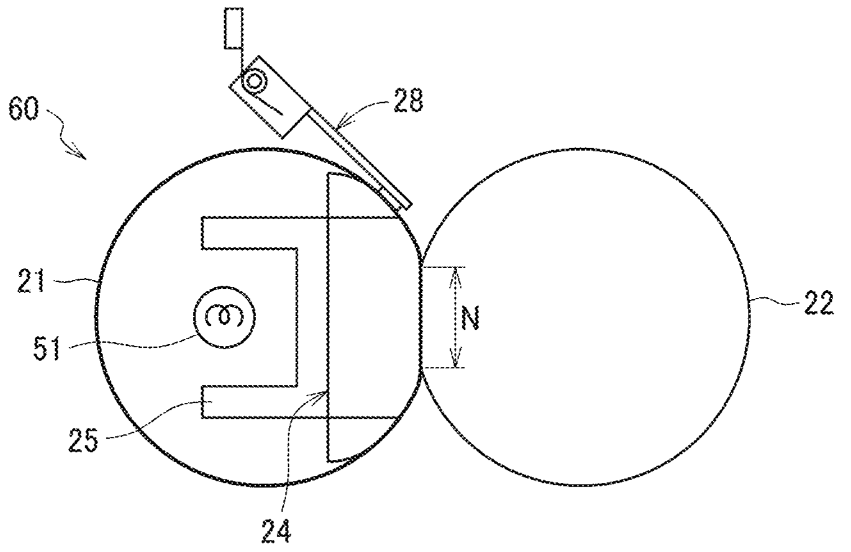
FIG. 17 is a schematic view of the fixing device including a nip formation pad that does not hold the heater.

The fixing device 60 illustrated in FIG. 17 includes the fixing belt 21, the pressure roller 22, the nip formation pad 24, the stay 25, the separation plate 28, and a halogen heater 51 as a heater not held by the nip formation pad 24.

Figure 18:
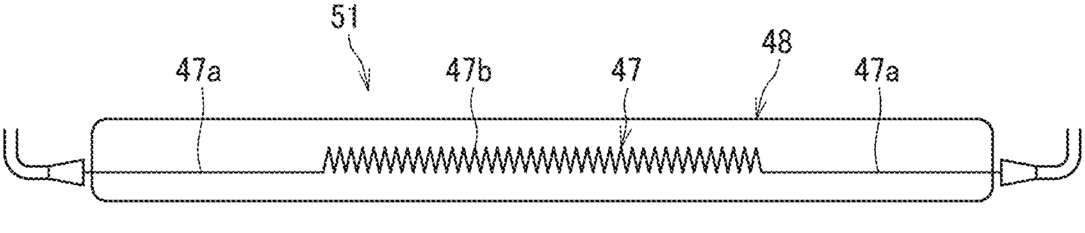
FIG. 18 is a schematic view of a configuration of a halogen heater.

As illustrated in FIG. 18, the halogen heater 51 includes a glass tube 48 made of quartz glass or the like and a filament 47 accommodated in the glass tube 48. The filament 47 has a linear part 47*a* having a linear shape and a densely wound part 47*b* densely wound in a coil shape. The densely wound part 47*b* is the resistive heat generator that generates heat when power is supplied to the halogen heater 51.

The halogen heater 51 is disposed inside the loop of the fixing belt 21 so as not to be in contact with the fixing belt 21 (see FIG. 17). When the halogen heater 51 generates heat, radiant heat emitted from the halogen heater 51 heats the fixing belt 21.

Even in the fixing device 60 including the nip formation pad 24 that does not hold the heater, disposing the separation plate 28 at the contactable position at which the separation plate 28 can come into contact with the nip formation pad 24 as the existing member via the fixing belt 21 can prevent the separation plate 28 from being pushed into the fixing belt 21. As a result, the damage of the fixing belt 21 is prevented. The embodiments of the present disclosure are applicable to fixing devices including other non-contact type heaters such as an electromagnetic induction heater and the like.

As described above, the embodiments of the present disclosure are applicable to the fixing device including the nip formation pad 24 that does not hold the heater. However, it is helpful to apply the above-described embodiments to the fixing device including the nip formation pad 24 holding the heater 23 to heat the nip N because the fixing belt is generally likely to be deformed. The deformation of the fixing belt causes fluctuation of the rotation trajectory of the fixing belt. A part of the separation plate in contact with the fixing belt maintains a constant clearance between the surface of the fixing belt and the leading end of the separation plate. However, the part of the separation plate in contact with the fixing belt may be strongly pushed into the surface of the fixing belt.

In the fixing devices according to the embodiments described above, the fixing belt is likely to be deformed for the following reasons.

The fixing device in each of the above-described embodiments includes the nip formation pad 24 holding the heater 23 that heats the nip N as illustrated in FIG. 2. The above-described configuration causes variation in temperature decrease rates (in other words, cooling rates) of the fixing belt 21 between the nip N and other portions after the fixing device completes the fixing process and stops the heat generation of the heater 23. After the fixing belt 21 stops rotating, the temperature decrease rate of the fixing belt 21 in the nip is slow due to the influence of the heat remaining in the heater 23. In contrast, the temperature decrease rate of the fixing belt 21 in portions other than the nip is fast because the heat remaining in the heater 23 does not affect the temperature of the fixing belt 21. As described above, the configuration in the above-described embodiments including the heater 23 facing the nip causes the variation in the temperature decrease rates of portions of the fixing belt 21 after the fixing process, and the variation is likely to cause the plastic deformation of the fixing belt 21.

In addition, the heater 23 in each of the above-described embodiments has a flat surface in contact with the fixing belt 21, and the fixing belt 21 is sandwiched between the pressure roller 22 and the flat surface of the heater 23. Keeping this state is likely deform the fixing belt 21. That is, the fixing belt 21 basically having a cylindrical shape largely deforms in the nip N to contact the flat surface of the heater 23. As a result, plastic deformation of the fixing belt 21 easily occurs. In addition, since the fixing belt 21 including the base layer made of resin has lower rigidity than the fixing belt including the base layer made of metal, the fixing belt 21 is more likely to cause the plastic deformation.

The configuration in each of the above-described embodiments including the fixing belt 21 that is driven to rotate by the pressure roller 22 also easily causes the deformation of the fixing belt 21. A large clearance is set between parts disposed in the loop of the fixing belt 21 and the fixing belt 21 that is driven to rotate by the pressure roller. The large clearance enables a large deformation of the fixing belt 21 (in other words, a large variation in the rotation trajectory).

In addition, the outer diameter of the fixing belt 21 that is larger than the outer diameter of the pressure roller 22 is likely to cause the deformation of the fixing belt 21. The outer diameter of the fixing belt 21 that is larger than the outer diameter of the pressure roller 22 increases the width of the nip N. The large width of the nip N enables increasing the width of the heater 23 facing the nip N, which enables improving productivity (in other words, increasing the number of printed sheets per unit time). However, the large width of the nip N increases the deformation of the fixing belt 21 at the nip N and easily causes the plastic deformation of the fixing belt 21.

Figure 19:
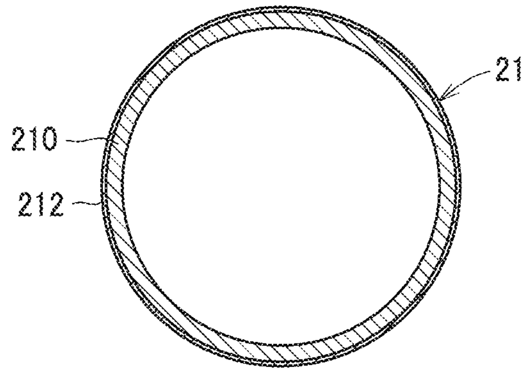
FIG. 19 is a cross-sectional view of the fixing belt having no elastic layer.
Figure 21:
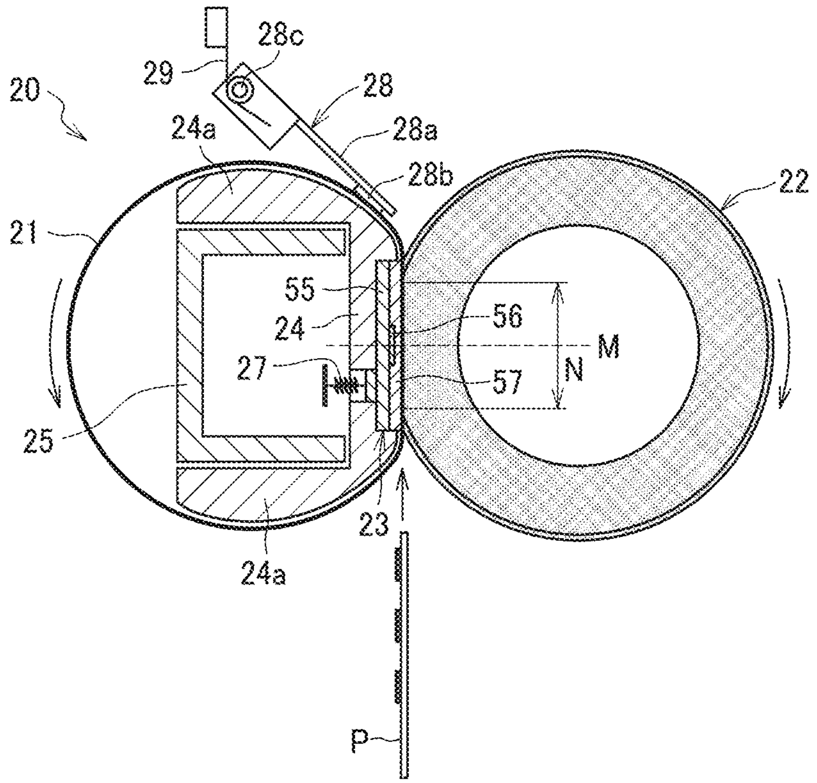
FIG. 21 is a schematic cross-sectional side view of the fixing device having a configuration different from the above-described fixing devices.

The fixing belt not including the elastic layer, which is different from the fixing belt 21 in each of the above-described embodiments, easily causes the deformation. The fixing belt 21 illustrated in FIG. 19 includes the base layer 210 and a surface layer that is the release layer 212 on the outer peripheral surface of the base layer 210 and does not include an elastic layer such as a rubber layer between the surface layer and the base layer 210. The thermal insulation property of the fixing belt illustrated in FIG. 21 is lower than that of the fixing belt including the elastic layer. In other words, the fixing belt 21 illustrated in FIG. 21 has high thermal conductivity to transfer heat from the heater to the outer peripheral surface of the fixing belt as compared with the fixing belt including the elastic layer. However, since the fixing belt 21 illustrated in FIG. 21 has low rigidity, plastic deformation of the fixing belt 21 easily occurs.

As described above, there are various reasons why deformation of the fixing belt is likely to occur. In particular, applying the embodiments of the present disclosure to the configuration having the above-described reasons provides a large effect. That is, applying the embodiments of the present disclosure to the configuration in which the clearance between the separation plate and the fixing belt is likely to vary due to deformation of the fixing belt enables keeping the constant clearance between the leading end of the separation plate and the surface of the fixing belt and preventing the separation plate from being pushed into the surface of the fixing belt by using the existing member, thereby preventing damage to the fixing belt.

Figure 20:
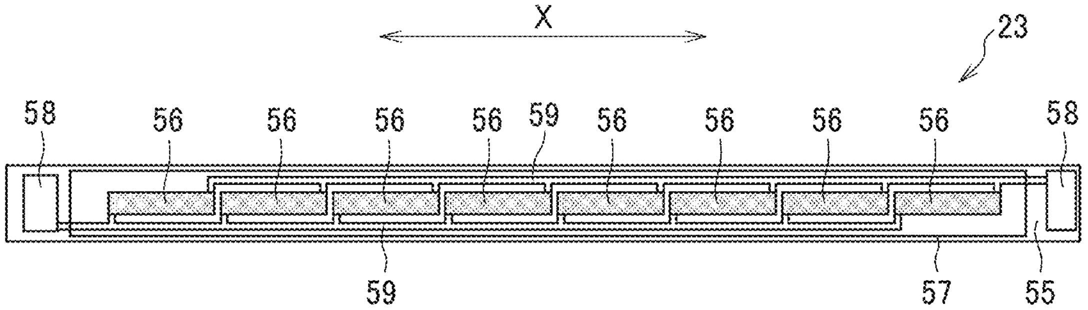
FIG. 20 is a plan view of the heater including multiple resistive heat generators.

The heater in the embodiments of the present disclosure is not limited to the heater 23 including the resistive heat generators 56 each continuously extending in the longitudinal direction X of the base 55 as illustrated in FIG. 6 but may be a heater 23 including multiple resistive heat generators 56 arranged in the longitudinal direction X of the base 55 as illustrated in FIG. 20. In the embodiment illustrated in FIG. 20, resistive heat generators 56 are electrically coupled in parallel to the electrodes 58 via power supply lines 59.

The heater 23 including the multiple resistive heat generators 56 as described above is suitable for the configuration having the large width of the nip to improve the productivity. However, the large width of the nip N easily causes the plastic deformation of the fixing belt 21. Therefore, applying the embodiments of the present disclosure to the configuration is preferable. Applying each of the embodiments of the present disclosure to the configuration enables maintaining the constant clearance between the surface of the fixing belt and the leading end of the separation plate and preventing the separation plate from being pushed into the surface of the fixing belt.

Figure 22:
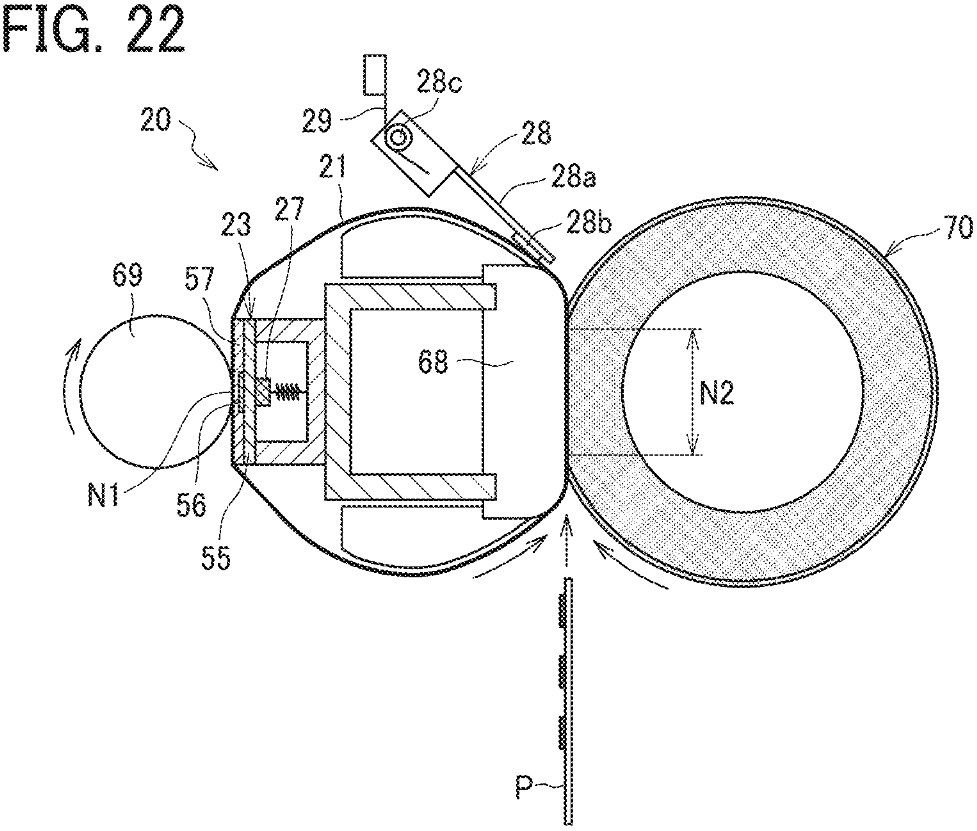
FIG. 22 is a schematic cross-sectional side view of the fixing device having a configuration different from the above-described fixing devices.
Figure 23:
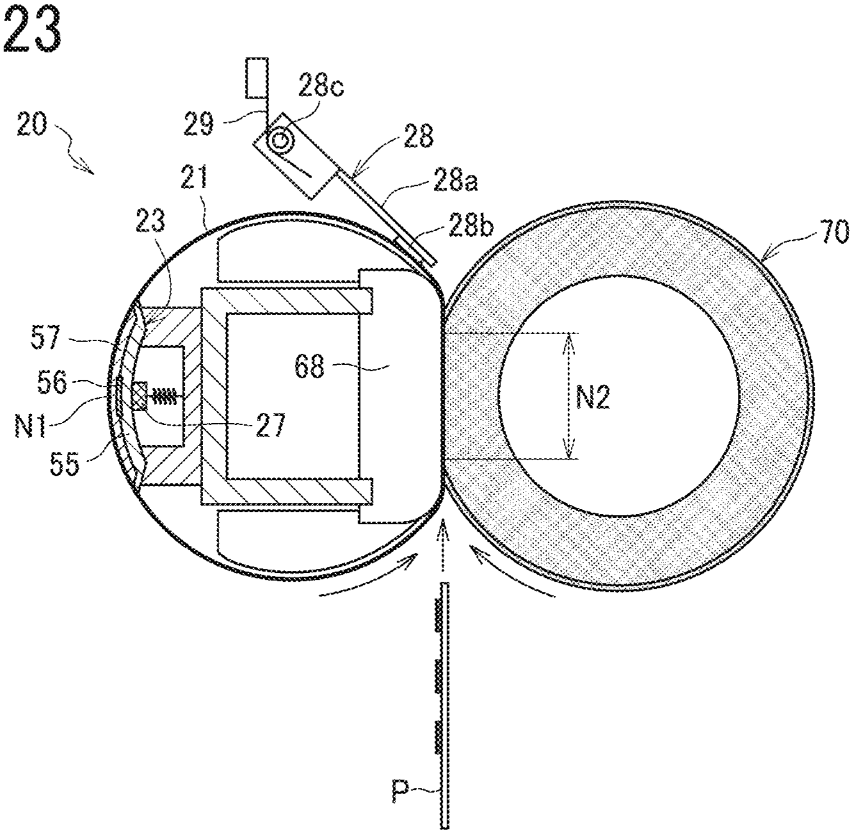
FIG. 23 is a schematic cross-sectional side view of the fixing device having a configuration different from the above-described fixing devices.

In addition, the embodiments of the present disclosure are applicable to fixing devices illustrated in FIGS. 21 to 23. The configurations of fixing devices illustrated in FIGS. 21 to 23 are described below. In the configurations illustrated in FIGS. 21 to 23, components common to those of the fixing device 20 of the above-described embodiment illustrated in FIG. 2 are denoted by the same reference numerals, and a description thereof will be omitted.

A different point between the fixing device 20 illustrated in FIG. 21 and the fixing device 20 illustrated in FIG. 2 is the position of the temperature sensor 27 to detect the temperature of the heater 23. Other than that, the configuration illustrated in FIG. 21 is the same as that in FIG. 2. In the fixing device 20 illustrated in FIG. 21, the temperature sensor 27 is disposed upstream from the center M of the nip N in the sheet passing direction (that is, near a nip entrance). In the fixing device 20 illustrated in FIG. 2, the temperature sensor 27 is disposed opposite to the center M of the nip N. The temperature sensor 27 disposed upstream from the center M of the nip N in the sheet passing direction as illustrated in FIG. 21 can accurately detect the temperature near the nip entrance. Since the sheet P entering the nip N particularly easily take away heat of the fixing belt 21 in a portion near the nip entrance, the temperature sensor 27 that accurately detects the temperature at the portion near the nip entrance enables ensuring the fixing property of the image and effectively preventing the occurrence of fixing offset (that is, a state in which the toner image cannot be sufficiently heated).

Next, the fixing device 20 in the embodiment illustrated in FIG. 22 has a heating nip N1 in which the heater 23 heats the fixing belt 21 and a nip N2 through which the sheet P passes, and the heating nip N1 and the nip N2 are formed at different positions. Specifically, the fixing device 20 in the present embodiment includes a nip formation pad 68 and the heater 23 that are disposed at different positions inside the loop of the fixing belt 21. A pressure roller 69 presses against the heater 23 via the fixing belt 21 to form the heating nip N1, and a pressure roller 70 presses against the nip formation pad 68 to form the fixing nip N2. In the above-described fixing device 20, the heater 23 heats the fixing belt 21 in the heating nip N1, and the fixing belt 21 applies the heat to the sheet P in the fixing nip N2 to fix the unfixed image onto the sheet P.

Next, the fixing device 20 illustrated in FIG. 23 omits the above-described pressure roller 69 adjacent to the heater 23 from the fixing device 20 illustrated in FIG. 22 and includes the heater 23 formed to be arc having a curvature of the fixing belt 21. The other configuration is the same as the configuration illustrated in FIG. 22. In this case, the arc shaped heater 23 surely maintains a length of the contact between the fixing belt 21 and the heater 23 in a belt rotation direction to efficiently heat the fixing belt 21.

Figure 24:
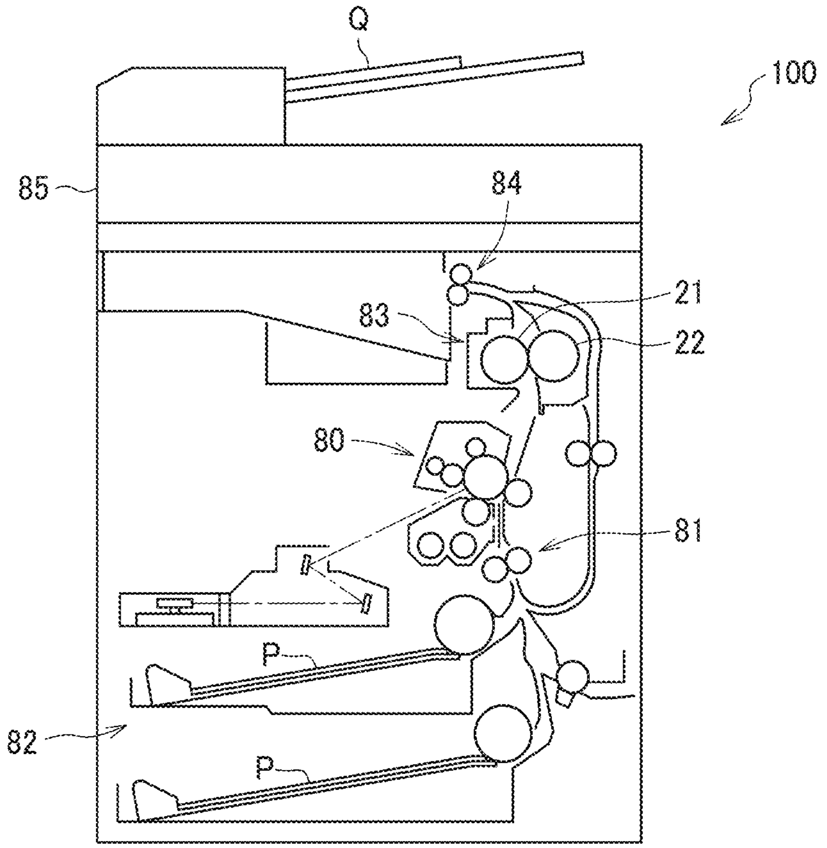
FIG. 24 is a schematic cross-sectional view of an image forming apparatus having a configuration different from the image forming apparatus of FIG. 1.

The image forming apparatus to which the embodiments of the present disclosure may be applied is not limited to the color image forming apparatus illustrated in FIG. 1, and the embodiments of the present disclosure may be applied to an image forming apparatus having a configuration illustrated in FIG. 24. The following describes another embodiment of the image forming apparatus to which the present embodiments may be applied.

The image forming apparatus 100 illustrated in FIG. 24 includes an image forming device 80 including a photoconductor drum and the like, a sheet conveyer including a timing roller pair 81 and the like, a sheet feeder 82, a fixing device 83, a sheet ejection device 84, and a reading device 85. The sheet feeder 82 includes a plurality of sheet feeding trays, and the sheet feeding trays stores sheets of different sizes, respectively.

The reading device 85 reads an image of a document Q. The reading device 85 generates image data from the read image. The sheet feeder 82 stores the plurality of sheets P and feeds the sheet P to the conveyance path. The timing roller pair 81 conveys the sheet P on the conveyance path to the image forming device 80.

The image forming device 80 forms a toner image on the sheet P. Specifically, the image forming device 80 includes the photoconductor drum, a charging roller, the exposure device, the developing device, a supply device, a transfer roller, the cleaning device, and a discharger. The fixing device 83 heats and presses the toner image to fix the toner image on the sheet P. Conveyance rollers convey the sheet P on which the toner image has been fixed to the sheet ejection device 84. The sheet ejection device 84 ejects the sheet P to the outside of the image forming apparatus 100.

Next, a fixing device 83 according to the present embodiment is described with reference to FIG. 25. In the configuration illustrated in FIG. 25, components common to those of the fixing device 20 of the above-described embodiment illustrated in FIG. 2 are denoted by the same reference numerals, and a description thereof will be omitted.

Figure 25:
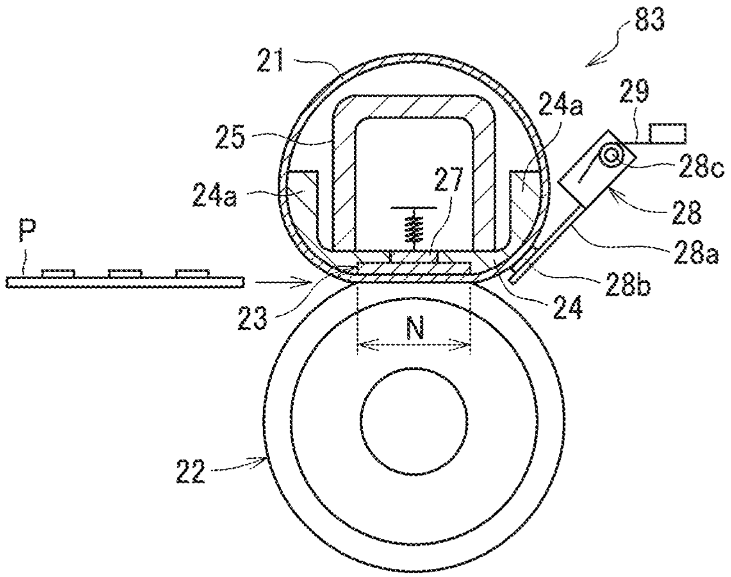
FIG. 25 is a cross-sectional view of the fixing device illustrated in FIG. 24.

As illustrated in FIG. 25, the fixing device 83 includes the fixing belt 21, the pressure roller 22, the heater 23, the nip formation pad 24, the stay 25, the temperature sensors 27, and the separation plate 28.

The nip N is formed between the fixing belt 21 and the pressure roller 22. The nip width of the nip N is 10 mm, and the linear velocity of the fixing device 83 is 240 mm/s.

The fixing belt 21 includes a polyimide base layer and the release layer and does not include the elastic layer. The release layer is made of a heat-resistant film material made of, for example, fluororesin. The outer loop diameter of the fixing belt 21 is about 24 mm.

The pressure roller 22 includes the core, the elastic layer, and the release layer. The pressure roller 22 has an outer diameter of 24 mm to 30 mm, and the elastic layer has a thickness of 3 mm to 4 mm.

The heater 23 includes the base, a thermal insulation layer, a conductor layer including the resistive heat generator and the like, and the insulation layer, and is formed to have a thickness of 1 mm as a whole. The width of the heater 23 in the sheet conveyance direction is, for example, 13 mm.

Figure 26:
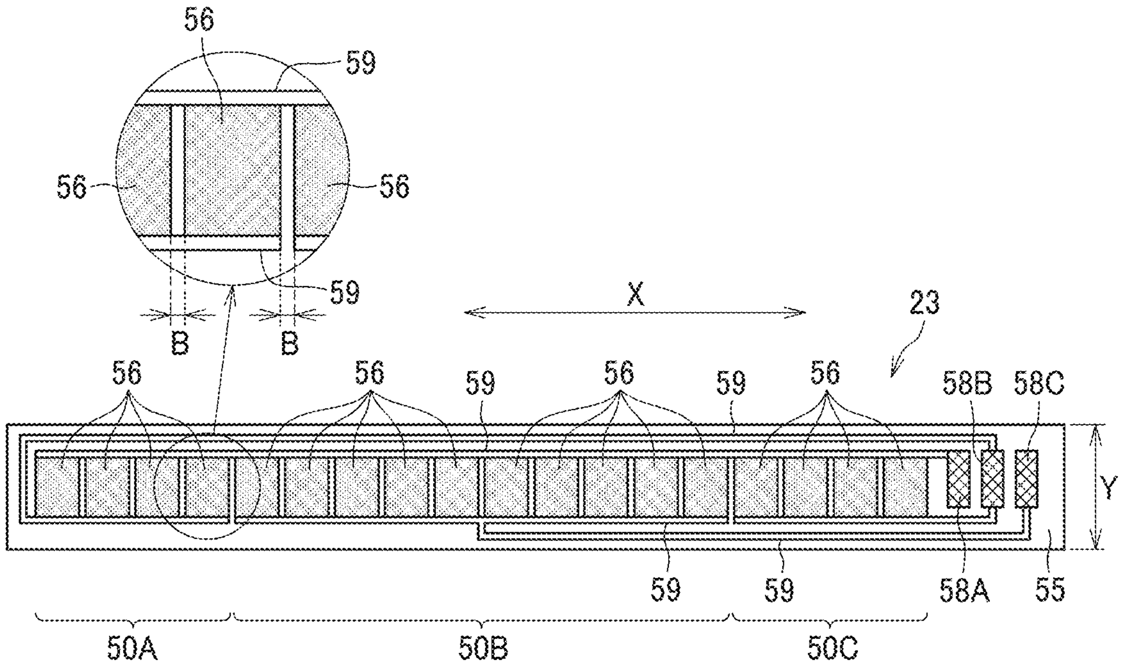
FIG. 26 is a plan view of the heater illustrated in FIG. 25.

As illustrated in FIG. 26, the conductor layer of the heater 23 includes the plurality of resistive heat generators 56, the power supply lines 59, and electrodes 58A to 58C. The plurality of resistive heat generators 56 are arranged at intervals in the longitudinal direction of the heater 23 (that is, the direction indicated by the arrow X). Hereinafter, a portion between the neighboring resistive heat generators 56 is referred to as a separation area B. As illustrated in an enlarged view of FIG. 26, the separation area B is formed between neighboring resistive heat generators of the plurality of resistive heat generators 56. The enlarged view of FIG. 26 illustrates two separation areas B, but the separation area B is formed between the neighboring resistive heat generators of all the plurality of resistive heat generators 56. In FIG. 26, a direction indicated by an arrow Y is a direction intersecting or orthogonal to the longitudinal direction X of the heater 23, which is referred to as a longitudinal intersecting direction. The longitudinal intersecting direction is different from a thickness direction of the base 55.

In addition, the direction indicated by the arrow Y is the same direction as a direction intersecting an arrangement direction of the plurality of resistive heat generators 56, a short-side direction of the heater 23 along a surface of the base 55 on which the resistive heat generators 56 are disposed, and the sheet conveyance direction of the sheet passing through fixing device.

The heater 23 includes a central heat generation portion 50B and end heat generation portions 50A and 50C at both sides of the central heat generation portion 50B. The central heat generation portion 50B and the end heat generation portions 50A and 50C are configured by the plurality of resistive heat generators 56. The end heat generation portions 50A and can generate heat separately from the central heat generation portion 50B. For example, choosing a left electrode 58A and a central electrode 58B of the three electrodes 58A to 58C and applying a voltage between the left electrode 58A and the central electrode 58B in FIG. 26 causes the end heat generation portions 50A and 50C adjacent to both sides of the central heat generation portion 50B to generate heat. Applying the voltage between the left electrode 58A and a right electrode 58C causes the central heat generation portion 50B to generate heat. To fix the image onto a small sheet, the central heat generation portion 50B alone can generate heat. To fix the image onto a large sheet, all the heat generation portions 50A to 50C can generate heat. As a result, the heater in the fixing device can generate heat in accordance with the size of the sheet.

Figure 27:
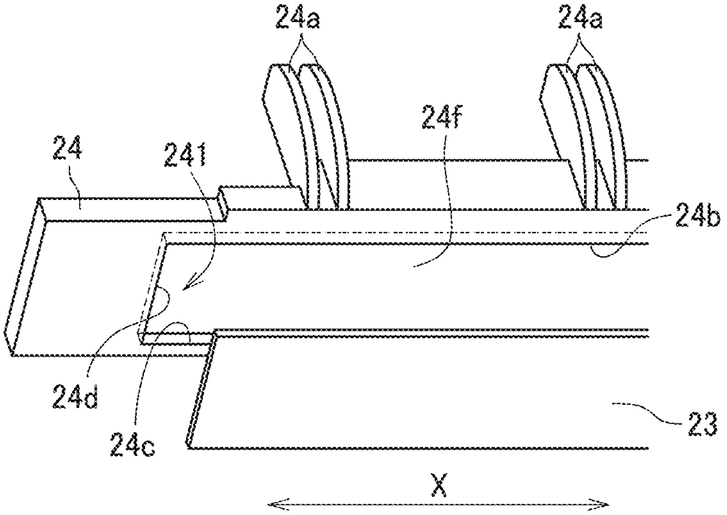
FIG. 27 is a partial perspective view of the heater and the nip formation pad illustrated in FIG. 25.

As illustrated in FIG. 27, the nip formation pad 24 according to the present embodiment includes the recessed portion 241 to receive and hold the heater 23. The recessed portion 241 is formed on the side of the nip formation pad 24 facing the heater 23. The recessed portion 241 has a bottom **24*f* formed in a rectangular shape having substantially the same size as the heater 23, and four side walls 24*b*, 24*c*, 24*d*, and 24*e* disposed on four sides of the bottom 24*f*, respectively. In FIG. 27, the right side wall 24*e* is omitted. The recessed portion 241 may have an opening that opens toward one end in the longitudinal direction of the heater 23. The opening is configured by removing one of a pair of the left side wall 24*d* and the right side wall 24*e* that intersect the longitudinal direction X of the heater 23 (that is, the arrangement direction of the resistive heat generators 56**).

Figure 28:
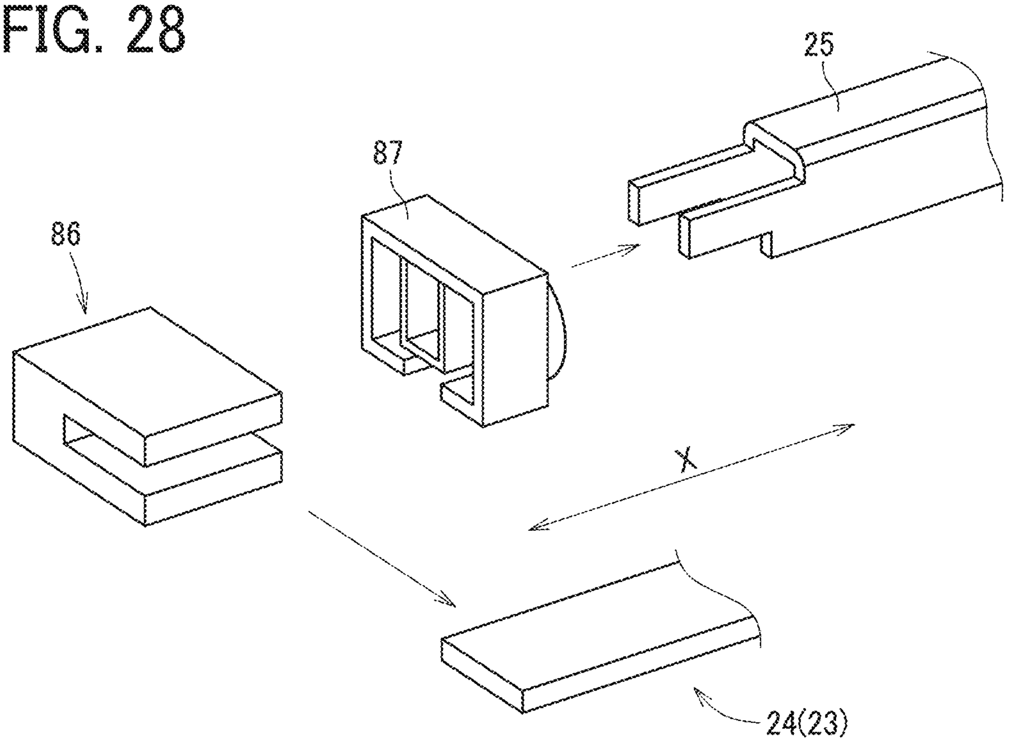
FIG. 28 is a view to illustrate a method of attaching a connector to the heater illustrated in FIG. 25.

As illustrated in FIG. 28, a connector 86 holds the heater 23 and the nip formation pad 24 according to the present embodiment. The connector 86 includes a housing made of resin such as LCP and a plurality of contact terminals fixed to the inner surface of the housing.

To attach to the heater 23 and the nip formation pad 24, the connector 86 is moved in the direction intersecting the longitudinal direction X of the heater 23 that is the arrangement direction of the resistive heat generators 56 (see a direction indicated by an arrow extending from the connector 86 in FIG. 28). The connector 86 is attached to one end of the heater 23 and one end of the nip formation pad 24 in the longitudinal direction X of the heater 23 that is the arrangement direction of the resistive heat generators 56. The one end of the heater 23 and the one end of the nip formation pad 24 are farther from a portion in which the pressure roller 22 receives a driving force from a drive motor than the other end of the heater 23 and the other end of the nip formation pad 24, respectively. The connector 86 and the nip formation pad 24 may have a convex portion and a recessed portion to attach the connector 86 to the nip formation pad 24. The convex portion disposed on one of the connector 86 and the nip formation pad 24 is engaged with the recessed portion disposed on the other and relatively move in the recessed portion to attach the connector 86 to the nip formation pad 24.

After the connector 86 is attached to the heater 23 and the nip formation pad 24, the heater 23 and the nip formation pad 24 are sandwiched and held by the connector 86. In this state, the contact terminals contact and press against the electrodes of the heater 23, respectively, and the resistive heat generators 56 are electrically coupled to the power supply disposed in the image forming apparatus via the connector 86. As a result, the power supply can supply electric power to the resistive heat generators 56.

A flange 87 illustrated in FIG. 28 is the belt holder in contact with the inner circumferential surface of the fixing belt 21 at each of both ends of the fixing belt 21 in the longitudinal direction of the fixing belt 21 to hold the fixing belt 21. The flange 87 is inserted into each of both ends of the stay 25 and is fixed to each of a pair of side plates that are frame members of the fixing device.

Figure 29:
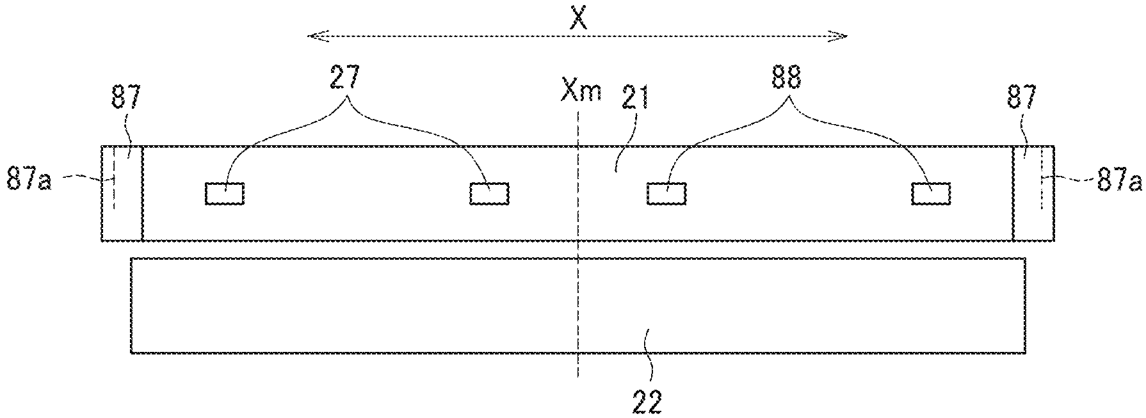
FIG. 29 is a diagram illustrating an arrangement of temperature sensors and thermostats included in the fixing device illustrated in FIG. 24.

FIG. 29 is a diagram illustrating an arrangement of temperature sensors 27 and thermostats 88 included in the fixing device according to the present embodiment. Each of the thermostats 88 cuts off a current flowing through the resistive heat generators under a certain condition.

As illustrated in FIG. 29, one of the temperature sensors 27 according to the present embodiment is disposed to face the inner circumferential surface of the fixing belt 21 near the center Xm of the fixing belt 21 in the longitudinal direction of the fixing belt 21 indicated by the arrow X, and the other one of the temperature sensor 27 is disposed to face the inner circumferential surface of the fixing belt 21 near the end of the fixing belt 21 in the longitudinal direction. One of the temperature sensors 27 is disposed at a position corresponding to the separation area B (see FIG. 26) between the resistive heat generators of the heater 23.

In addition, one of the thermostats 88 is disposed to face the inner circumferential surface of the fixing belt 21 near the center Xm of the fixing belt 21, and the other one of the thermostats 88 is disposed to face the inner circumferential surface of the fixing belt 21 near the end of the fixing belt 21. Each thermostat 88 detects the temperature of the inner circumferential surface of the fixing belt 21 or the ambient temperature in the vicinity of the inner circumferential surface of the fixing belt 21. The thermostat 88 cuts off the current flowing to the heater 23 in response to detecting the temperature that exceeds a preset threshold value.

Figure 30:
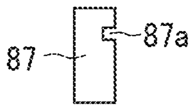
FIG. 30 is a schematic diagram illustrating a groove of a flange illustrated in FIG. 28.

As illustrated in FIGS. 29 and 30, flanges 87 to hold both ends of the fixing belt 21 each have a slide groove 87*a*. The slide groove 87*a* extends in a direction in which the fixing belt 21 moves toward and away from the pressure roller 22. An engaging portion of a housing of the fixing device 20 is engaged with the slide groove 87*a*. The relative movement of the engaging portion in the slide groove 87*a* enables the fixing belt 21 to move toward and away from the pressure roller 22.

The present disclosure is also applicable to the fixing device having the following configuration.

Figure 31:
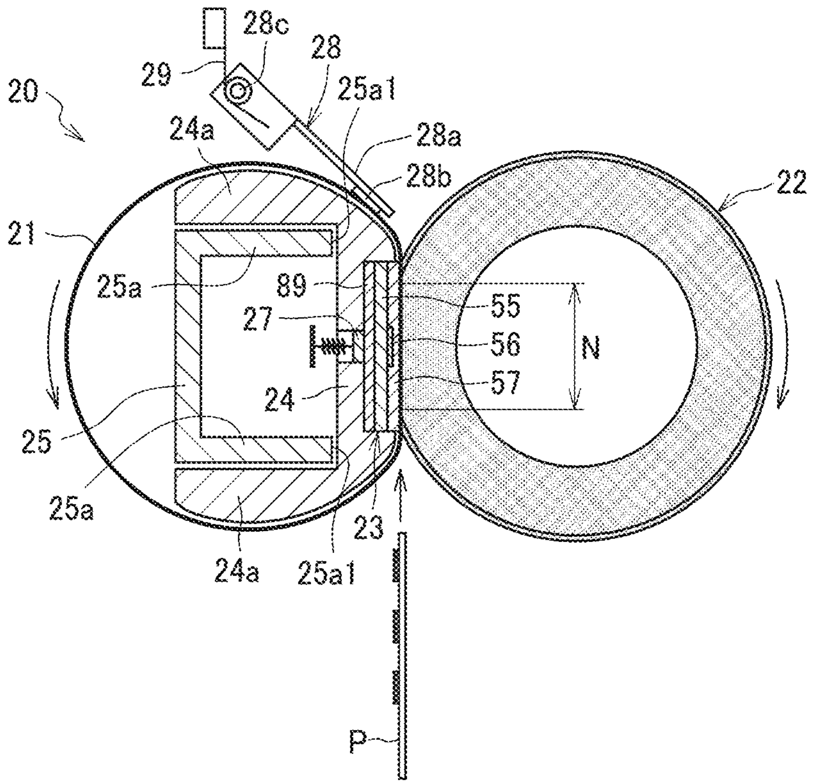
FIG. 31 is a schematic cross-sectional side view of the fixing device having a configuration different from the above-described fixing devices.

FIG. 31 is a schematic view of a fixing device having a different configuration from the fixing devices described above. The above-described embodiments may be applied to the fixing device in FIG. 31.

As illustrated in FIG. 31, the fixing device 20 includes the fixing belt 21 as the fixing rotator, the pressure roller 22 as the opposed rotator or the pressure rotator, the heater 23 as the heat source, the nip formation pad 24 that also functions as the heater holder, the stay 25 as the support, the temperature sensor 27 that is the thermistor as the temperature detector, a first high thermal conduction member 89, and the separation plate 28. The fixing belt 21 is the endless belt. The pressure roller 22 is in contact with the outer circumferential surface of the fixing belt 21 to form the nip N between the pressure roller 22 and the fixing belt 21. The heater 23 heats the fixing belt 21. The nip formation pad 24 holds the heater 23. The stay 25 supports the nip formation pad 24. The temperature sensor 27 detects the temperature of the first high thermal conduction member 89. The separation plate 28 separates the sheet P having passed through the nip N from the fixing belt 21. That is, the fixing device 20 according to the present embodiment has basically the same configuration as the fixing device illustrated in FIG. 2 except that the fixing device 20 includes the first high thermal conduction member 89. The direction perpendicular to the sheet surface of FIG. 31 is the longitudinal direction of the fixing belt 21, the pressure roller 22, the heater 23, the nip formation pad 24, the stay 25, the first high thermal conduction member 89, and the separation plate 28. This direction is hereinafter simply referred to as the longitudinal direction. The longitudinal direction is also the width direction of the conveyed sheet, the belt width direction of the fixing belt 21, and the axial direction of the pressure roller 22.

The heater 23 in the present embodiment includes a plurality of resistive heat generators 56 arranged at intervals in the longitudinal direction of the heater 23, which is the same as the heater illustrated in FIG. 26. In the heater 23 including the plurality of resistive heat generators 56 arranged at intervals, the temperature of the heater 23 in the separation area B corresponding to the interval between the resistive heat generators 56 tends to be lower than the temperature of the heater 23 in a portion entirely occupied by the resistive heat generator 56. For this reason, the temperature of the fixing belt 21 corresponding to the separation area B also becomes low, which may cause an uneven temperature distribution of the fixing belt 21 in the longitudinal direction.

To prevent the above-described temperature drop in the separation area B and reduce the temperature unevenness in the longitudinal direction of the fixing belt 21, the fixing device in the present embodiment includes the first high thermal conduction member 89. Next, a detailed description is given of the first high thermal conduction member 89.

As illustrated in FIG. 31, the first high thermal conduction member 89 is disposed between the heater 23 and the stay 25 in the lateral direction of FIG. 31 and is particularly sandwiched between the heater 23 and the nip formation pad 24. One side of the first high thermal conduction member 89 is brought into contact with the back surface of the base 55 of the heater 23, and the other side (that is, the side opposite to the one side) of the first high thermal conduction member 89 is brought into contact with the nip formation pad 24.

The stay 25 has two rectangular portions 25*a* extending in a thickness direction of the heater 23 and each having a contact surface 25*a*1 that contacts the back side of the nip formation pad 24 to support the nip formation pad 24, the first high thermal conduction member 89, and the heater 23. In the direction intersecting the longitudinal direction that is the vertical direction in FIG. 31, the contact surfaces 25*a*1 are outside the resistive heat generators 56. The above-described structure prevents heat transfer from the heater 23 to the stay 25 and enables the heater 23 to effectively heat the fixing belt 21.

Figure 32:
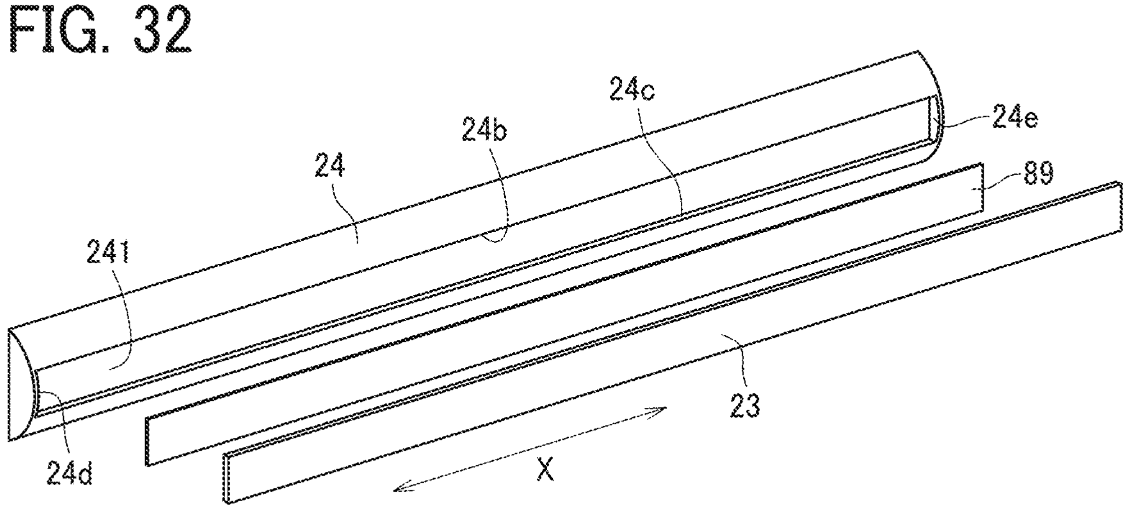
FIG. 32 is a perspective view of the heater, a first high thermal conduction member, and the nip formation pad that are illustrated in FIG. 31.

As illustrated in FIG. 32, the first high thermal conduction member 89 is a plate having a certain thickness such as 0 3 mm and having, for example, a length of 222 mm in the longitudinal direction, and a width of 10 mm in the direction intersecting the longitudinal direction. In the present embodiment, the first high thermal conduction member 89 is made of a single plate but may be made of a plurality of members. In FIG. 32, the guide 24*a* illustrated in FIG. 31 is omitted.

The first high thermal conduction member 89 is fitted into the recessed portion 241 of the nip formation pad 24, and the heater 23 is mounted thereon. Thus, the first high thermal conduction member 89 is sandwiched and held between the nip formation pad 24 and the heater 23. In the present embodiment, the length of the first high thermal conduction member 89 in the longitudinal direction is substantially the same as the length of the heater 23 in the longitudinal direction. Both side walls 24*d* and 24*e* extending in the direction intersecting the longitudinal direction of the recessed portion 241 restrict movement of the heater 23 and movement of the first high thermal conduction member 89 in the longitudinal direction and work as longitudinal direction regulators. Reducing a positional deviation of the first high thermal conduction member 89 in the longitudinal direction in the fixing device 20 improves the thermal conductivity efficiency with respect to a target range in the longitudinal direction. Both side walls 24*b* and 24*c* extending in the longitudinal direction of the recessed portion 241 restrict movement of the heater 23 and movement of the first high thermal conduction member 89 in the direction intersecting the longitudinal direction and work as direction-intersecting-arrangement-direction regulators.

Figure 33:
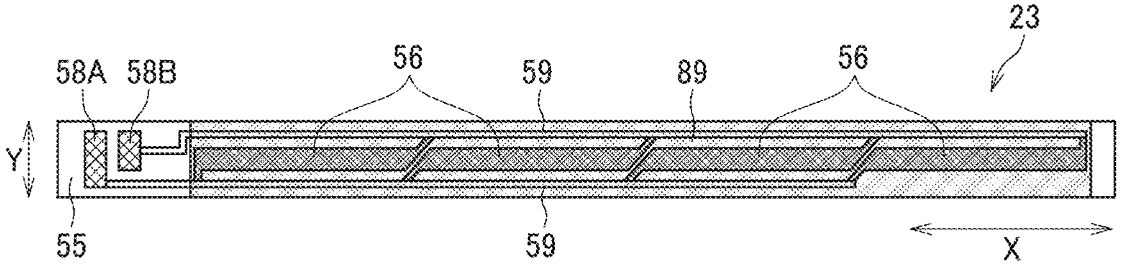
FIG. 33 is a plan view of the heater to illustrate a setting of the first high thermal conduction member.
Figure 34:
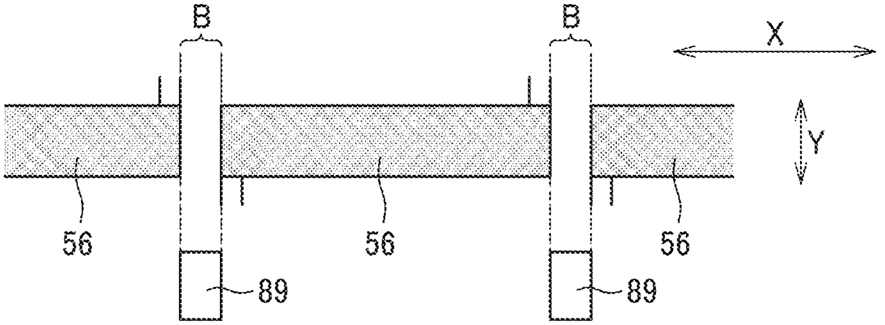
FIG. 34 is a schematic diagram illustrating another example of the setting of the first high thermal conduction members in the heater.
Figure 35:
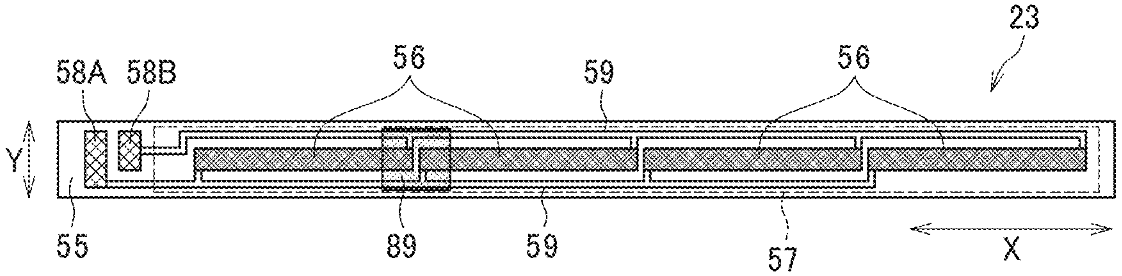
FIG. 35 is a plan view of the heater to illustrate still another example of the setting of the first high thermal conduction member.

The range in which the first high thermal conduction member 89 is disposed in the longitudinal direction indicated by the arrow X is not limited to the range illustrated in FIG. 32. For example, as illustrated in FIG. 33, the first high thermal conduction member 89 may be disposed in only a longitudinal range in which the resistive heat generators 56 are disposed (see a hatched portion in FIG. 33). As illustrated in FIG. 34, the first high thermal conduction members 89 may be disposed in only the entire separation areas at positions corresponding to the separation areas B (in other words, gap areas between the resistive heat generators) in the longitudinal direction indicated by the arrow X. In FIG. 34, for the sake of convenience, the resistive heat generators 56 and the first high thermal conduction members 89 are shifted in the vertical direction of FIG. 34 but are disposed at substantially the same position in the direction intersecting the longitudinal direction indicated by an arrow Y. In addition, the first high thermal conduction member 89 may be disposed over a part of the resistive heat generator 56 in the direction intersecting the longitudinal direction (the direction indicated by the arrow Y), or as in the example illustrated in FIG. 35, may be disposed so as to cover all the resistive heat generators 56 in the direction intersecting the longitudinal direction (the direction indicated by the arrow Y). As illustrated in FIG. 35, the first high thermal conduction member 89 may be disposed to face a part of each of the neighboring resistive heat generators 56 in addition to the gap area between the neighboring resistive heat generators 56. The first high thermal conduction member 89 may be disposed to face all separation areas B in the heater 23, one separation area B as illustrated in FIG. 35, or some of separation areas B. At least a part of the first high thermal conduction member 89 may be disposed to face the separation area B.

Due to the pressing force of the pressure roller 22, the first high thermal conduction member 89 is sandwiched between the heater 23 and the nip formation pad 24 and is brought into close contact with the heater 23 and the nip formation pad 24. Bringing the first high thermal conduction member 89 into contact with the heater 23 improves the heat conduction efficiency in the longitudinal direction of the heater 23. The first high thermal conduction member 89 facing the separation area B improves the heat conduction efficiency of a part of the heater 23 facing the separation area B in the longitudinal direction, transmits heat to the part of the heater 23 facing the separation area B, and raise the temperature of the part of the heater 23 facing the separation area B. Thus, the first high thermal conduction member 89 reduces temperature unevenness of the heater 23 in the longitudinal direction and the temperature unevenness of the fixing belt 21 in the longitudinal direction. As a result, the above-described structure can prevent uneven fixing and uneven gloss in the image fixed on the sheet. Since the heater 23 does not need to generate additional heat to secure sufficient fixing performance in the part of the heater 23 facing the separation area B, energy consumption of the fixing device can be saved. The first high thermal conduction member 89 disposed over the entire area in which the resistive heat generators 56 are arranged in the longitudinal direction improves the heat transfer efficiency of the heater 23 over the entire area of a main heating region of the heater 23 (that is, an area facing an image formation area of the sheet passing through the fixing device) and reduces the temperature unevenness of the heater 23 and the temperature unevenness of the fixing belt 21 in the longitudinal direction.

In addition, the combination of the first high thermal conduction member 89 and the resistive heat generator 56 having a Positive Temperature Coefficient (PTC) characteristic effectively prevents the overheating of the non-sheet passing region (that is the region of the fixing belt that is not in contact with the small sheet) of the fixing belt 21 when small sheets pass through the fixing device 20. The PTC characteristic is a characteristic in which the resistance value increases as the temperature increases, for example, a heater output decreases under a constant voltage. The resistive heat generator 56 having the PTC characteristic effectively reduces the amount of heat generated by the resistive heat generator 56 in the non-sheet passing region, and the first high thermal conduction member 89 effectively transfers heat from the non-sheet passing region in which the temperature rises to a sheet passing region that is a region of the fixing belt contacting the sheet. As a result, the overheating of the non-sheet passing region is effectively prevented.

Figure 36:
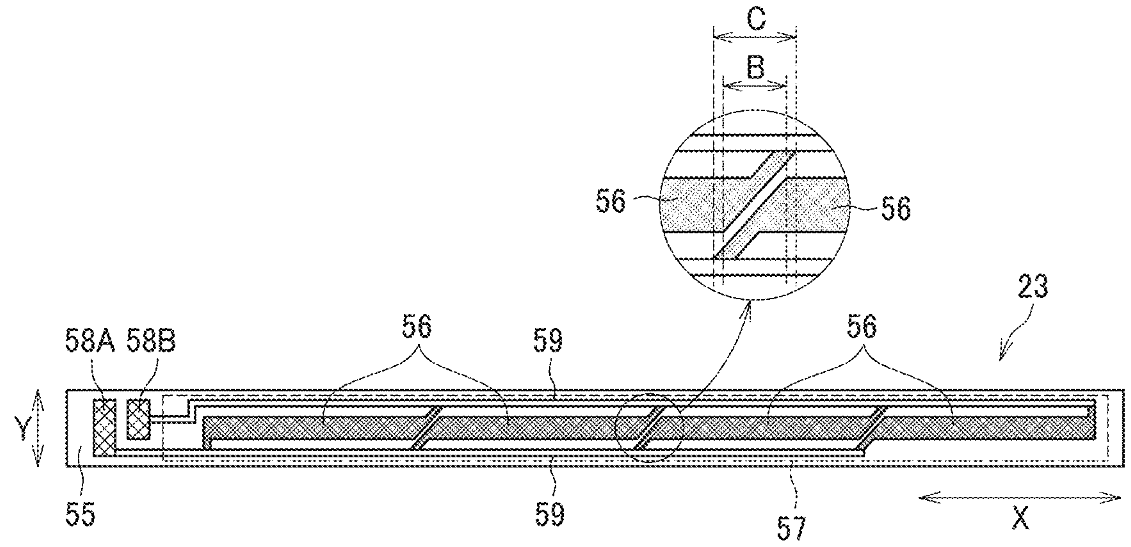
FIG. 36 is a plan view of the heater to illustrate enlarged separation areas.

The first high thermal conduction member 89 may be disposed opposite an area around the separation area B because the small heat generation amount in the separation area B decreases the temperature of the heater 23 in the area around the separation area B. For example, the first high thermal conduction member 89 facing an enlarged separation area C that includes the separation area B and an area around the separation area B as illustrated in FIG. 36 improves the heat transfer efficiency of the separation area B and the area around the separation area B in the longitudinal direction and effectively reduces the temperature unevenness in the longitudinal direction of the heaters 23. The first high thermal conduction member 89 facing the entire region in which all the resistive heat generators 56 are arranged in the longitudinal direction reduces the temperature unevenness of the heater 23 (and the fixing belt 21) in the longitudinal direction.

Next, another embodiment of the fixing device is described.

Figure 37:
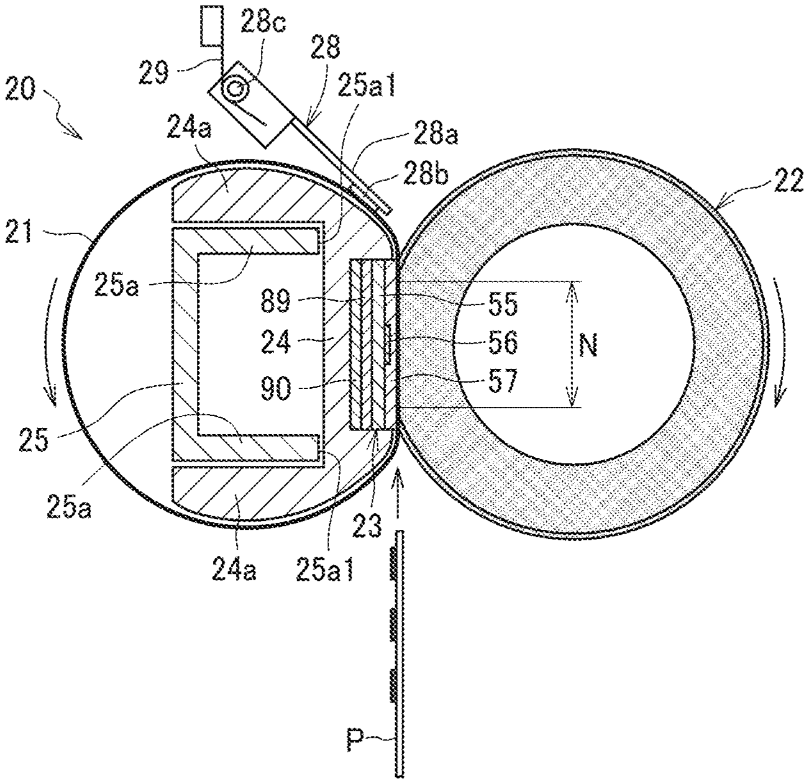
FIG. 37 is a schematic cross-sectional side view of the fixing device having a configuration different from the above-described fixing devices.

The fixing device 20 illustrated in FIG. 37 includes a second high thermal conduction member 90 between the nip formation pad 24 and the first high thermal conduction member 89. The second high thermal conduction member 90 is disposed at a position different from the position of the first high thermal conduction member 89 in the lateral direction in FIG. 37 that is a direction in which the nip formation pad 24, the stay 25, and the first high thermal conduction member 89 are layered. Specifically, the second high thermal conduction member 90 is disposed so as to overlap the first high thermal conduction member 89. The fixing device in the present embodiment includes the temperature sensor 27 (that is, the thermistor), which is the same as the fixing device illustrated in FIG. 31. FIG. 37 illustrates a cross section in which the temperature sensor 27 is not disposed.

The second high thermal conduction member 90 is made of a material having thermal conductivity higher than the thermal conductivity of the base 55, for example, graphene or graphite. In the present embodiment, the second high thermal conduction member 90 is made of a graphite sheet having a thickness of 1 mm. Alternatively, the second high thermal conduction member 90 may be a plate made of aluminum, copper, silver, or the like.

Figure 38:
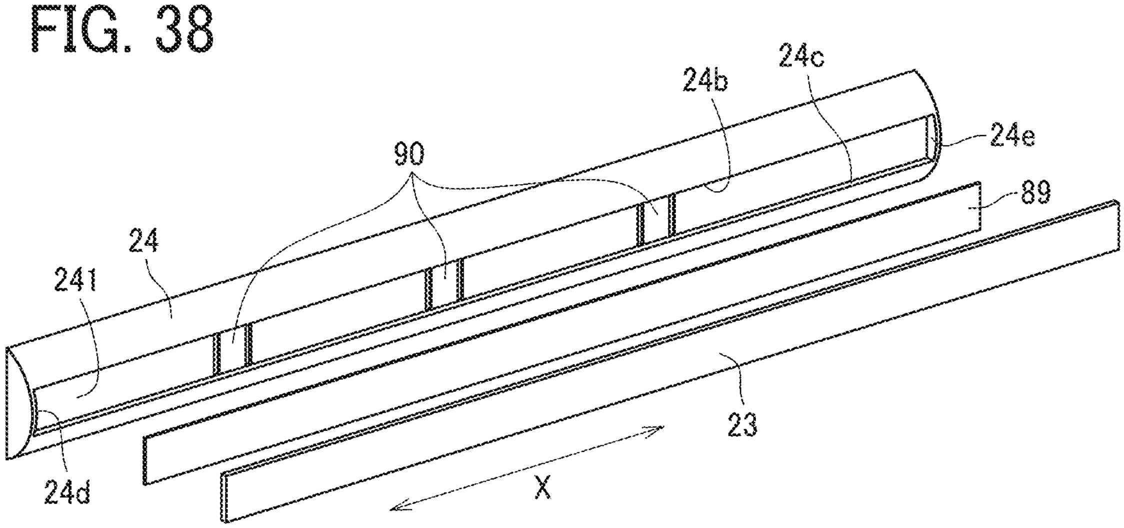
FIG. 38 is a perspective view of the heater, the first high thermal conduction member, second high thermal conduction members and the nip formation pad that are illustrated in FIG. 37.

As illustrated in FIG. 38, a plurality of second high thermal conduction members 90 is arranged on the recessed portion 241 of the nip formation pad 24 at intervals in the longitudinal direction.

The recessed portion 241 of the nip formation pad 24 has a plurality of holes in which the second high thermal conduction members 90 are disposed. Clearances are formed between the nip formation pad 24 and both sides of the second high thermal conduction member 90 in the longitudinal direction. The clearance prevents heat transfer from the second high thermal conduction member 90 to the nip formation pad 24, and the heater 23 efficiently heats the fixing belt 21. In FIG. 38, the guide 24*a* illustrated in FIG. 37 is omitted.

Figure 39:
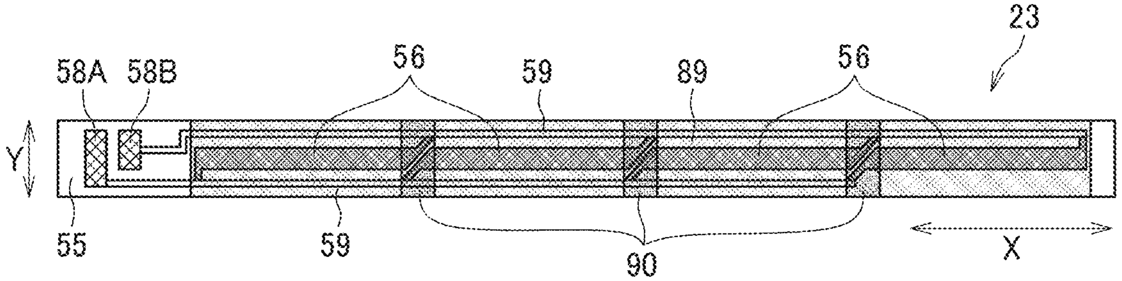
FIG. 39 is a plan view of the heater to illustrate an arrangement of the first high thermal conduction member and the second high thermal conduction members.

As illustrated in FIG. 39, each of the second high thermal conduction members 90 (see the hatched portions) is disposed at a position corresponding to the separation area B in the longitudinal direction indicated by the arrow X and faces at least a part of each of the neighboring resistive heat generators 56 in the longitudinal direction. In particular, each of the second high thermal conduction members 90 in the present embodiment faces the entire separation area B. FIG. 39 (and FIG. 41 described below) illustrates the first high thermal conduction member 89 facing the entire region in which all the resistive heat generators 56 are arranged in the longitudinal direction. The range in which the first high thermal conduction member 89 is disposed in the longitudinal direction is not limited to the above.

Figure 40:
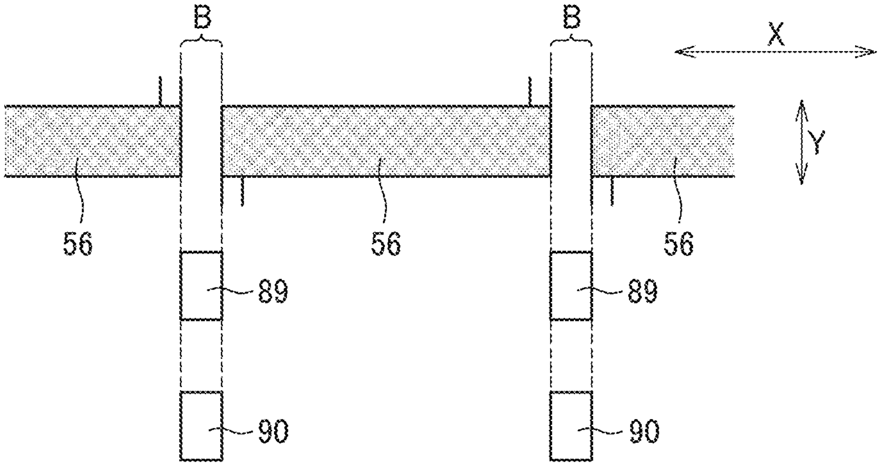
FIG. 40 is a diagram illustrating another arrangement of the first high thermal conduction members and the second high thermal conduction members.

The fixing device according to the present embodiment includes the second high thermal conduction member 90 disposed at a position corresponding to the separation area B in the longitudinal direction and the position at which at least a part of each of the neighboring resistive heat generators 56 faces the second high thermal conduction member 90 in addition to the first high thermal conduction member 89. The above-described structure further improves the heat transfer efficiency in the separation area B in the longitudinal direction and more efficiently reduces the temperature unevenness of the heater 23 in the longitudinal direction. As illustrated in FIG. 40, the first high thermal conduction members 89 and the second high thermal conduction member 90 may be disposed opposite the entire gap area between the resistive heat generators 56. The above-described structure improves the heat transfer efficiency of the part of the heater 23 corresponding to the gap area to be higher than the heat transfer efficiency of the other part of the heater 23. In FIG. 40, for the sake of convenience, the resistive heat generators 56, the first high thermal conduction members 89, and the second high thermal conduction member 90 are shifted in the vertical direction of FIG. 40 but are disposed at substantially the same position in the direction intersecting the longitudinal direction indicated by the arrow Y. However, the present disclosure is not limited to the above. The first high thermal conduction member 89 and the second high thermal conduction member 90 may be disposed opposite a part of the resistive heat generators 56 in the direction intersecting the longitudinal direction or may be disposed so as to cover the entire resistive heat generators 56 in the direction intersecting the longitudinal direction.

Both the first high thermal conduction member 89 and the second high thermal conduction member 90 may be made of a graphene sheet. The first high thermal conduction member 89 and the second high thermal conduction member 90 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 21 in the longitudinal direction and the temperature unevenness of the heater 23 in the longitudinal direction.

Figure 43:
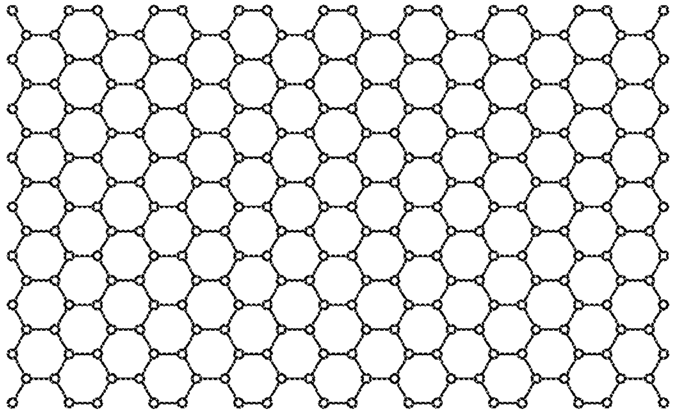
FIG. 43 is a schematic diagram illustrating a two-dimensional atomic crystal structure of graphene.

Graphene is a flaky powder. Graphene has a planar hexagonal lattice structure of carbon atoms, as illustrated in FIG. 43. The graphene sheet is usually a single layer. The graphene sheet may contain impurities in a single layer of carbon or may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 44:
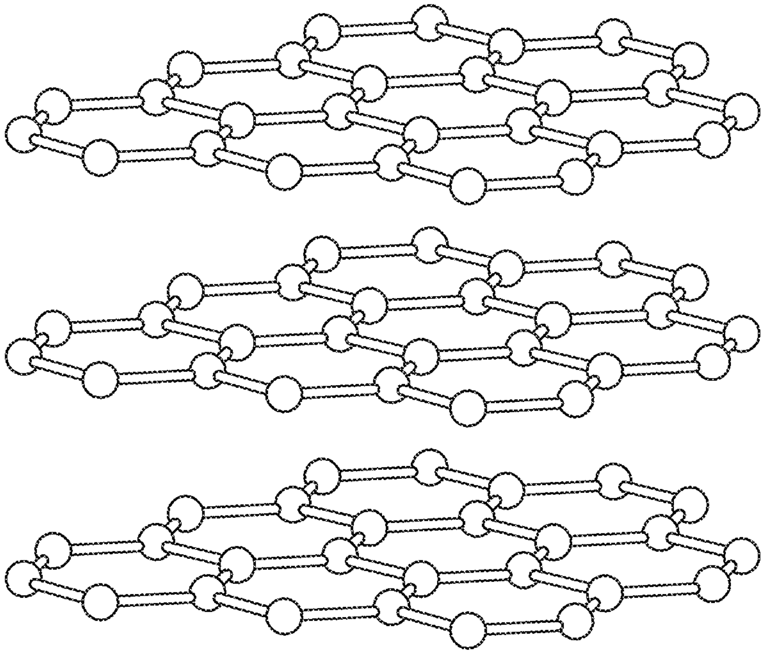
FIG. 44 is a schematic diagram illustrating a three-dimensional atomic crystal structure of graphite.

Graphite obtained by multilayering graphene has a large thermal conduction anisotropy. As illustrated in FIG. 44, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 89 and the second high thermal conduction member 90 that are made of graphite each have the heat transfer efficiency in the longitudinal direction larger than the heat transfer efficiency in the thickness direction of the first high thermal conduction member 89 and the second high thermal conduction member 90 (that is, the stacking direction of these members), reducing the heat transferred to the nip formation pad 24. Accordingly, the above-described structure can efficiently decrease the temperature unevenness of the heater 23 in the longitudinal direction and can minimize the heat transferred to the nip formation pad 24. Since the first high thermal conduction member 89 and the second high thermal conduction member 90 that are made of graphite are not oxidized at about 700 degrees or lower, the first high thermal conduction member 89 and the second high thermal conduction member 90 each have an excellent heat resistance.

The physical properties and dimensions of the graphite sheet may be appropriately changed according to the function required for the first high thermal conduction member 89 or the second high thermal conduction member 90. For example, the anisotropy of the thermal conduction can be increased by using high-purity graphite or single-crystal graphite or increasing the thickness of the graphite sheet. Using a thin graphite sheet can reduce the thermal capacity of the fixing device so that the fixing device can perform high speed printing. A width of the first high thermal conduction member 89 or a width of the second high thermal conduction member 90 in the direction intersecting the longitudinal direction may be increased in response to a large width of the nip N or a large width of the heater 23.

From the viewpoint of increasing mechanical strength, the number of layers of the graphite sheet is preferably 11 or more. The graphite sheet may partially include a single layer portion and a multilayer portion.

Figure 41:
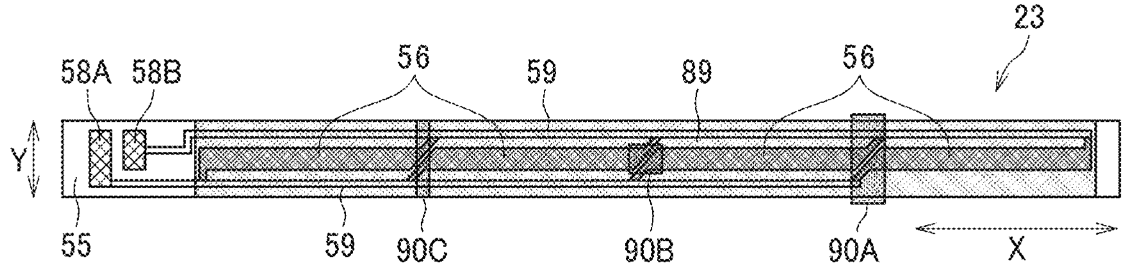
FIG. 41 is a plan view of the heater to illustrate other examples of arrangements of the second high thermal conduction member.

As long as the second high thermal conduction member 90 faces a part of each of neighboring resistive heat generators 56 and at least a part of the gap area between the neighboring resistive heat generators 56, the configuration of the second high thermal conduction member 90 is not limited to the configuration illustrated in FIG. 39. For example, as illustrated in FIG. 41, a second high thermal conduction member 90A is longer than the base 55 in the direction intersecting the longitudinal direction indicated by the arrow Y, and both ends of the second high thermal conduction member 90A in the direction intersecting the longitudinal direction are outside the base 55 in FIG. 41. A second high thermal conduction member 90B faces a range in which the resistive heat generators 56 are disposed in the direction intersecting the longitudinal direction. A second high thermal conduction member 90C faces a part of the gap area and a part of each of neighboring resistive heat generators 56.

Figure 42:
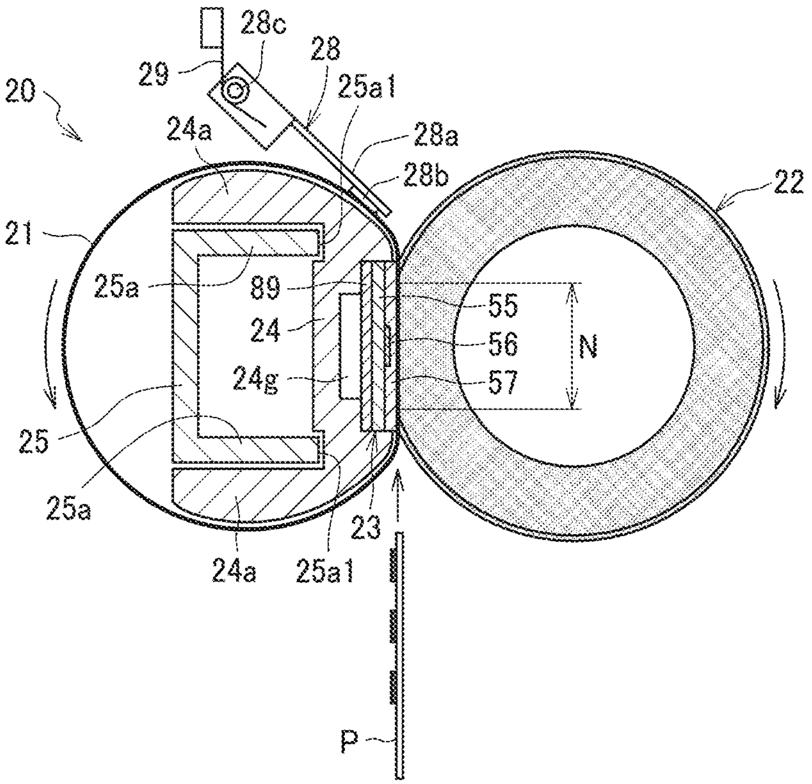
FIG. 42 is a schematic cross-sectional side view of the fixing device having a configuration different from the above-described fixing devices.

The fixing device according to an embodiment illustrated in FIG. 42 has a gap between the first high thermal conduction member 89 and the nip formation pad 24 in the thickness direction that is the lateral direction in FIG. 42. In other words, the fixing device has a gap 24*g* serving as a thermal insulation layer in a part of a region of the recessed portion 241 (see FIG. 38) of the nip formation pad 24 in which the heater 23, the first high thermal conduction member 89, and the second high thermal conduction member 90 are disposed. The gap 24*g* is in the part of the region of the recessed portion 241 in the longitudinal direction, and the second high thermal conduction member 90 is not in the part. Therefore, FIG. 42 does not include the second high thermal conduction member 90. The gap 24*g* has a depth deeper than the depth of the recessed portion 241 of the nip formation pad 24. The above-described structure minimizes the contact area between the nip formation pad 24 and the first high thermal conduction member 89. The gap 24*g* prevents heat transfer from the first high thermal conduction member 89 to the nip formation pad 24, and the heater 23 efficiently heats the fixing belt 21. In the cross section of the fixing device in which the second high thermal conduction member 90 is set, the second high thermal conduction member 90 is in contact with the nip formation pad 24 as illustrated in FIG. 37 of the above-described embodiment.

The gap 24*g* in the present embodiment is in an entire area in which the resistive heat generators 56 are disposed in the direction intersecting the longitudinal direction that is the vertical direction in FIG. 42. The above-described configuration efficiently prevents heat transfer from the first high thermal conduction member 89 to the nip formation pad 24, and the heater 23 efficiently heats the fixing belt 21. The fixing device 20 may include a thermal insulation layer made of heat insulator having a lower thermal conductivity than the thermal conductivity of the nip formation pad 24 instead of a space like the gap 24*g* serving as the thermal insulation layer.

In the present embodiment, the second high thermal conduction member 90 is a member different from the first high thermal conduction member 89, but the present embodiment is not limited to this. For example, the first high thermal conduction member 89 may have a thicker portion than the other portion so that the thicker portion faces the separation area B and functions as the second high thermal conduction member 90.

In the above, various configurations of the fixing device and the image forming apparatus in which the embodiments of the present disclosure can be applied are described. Applying the embodiments to the various configurations of the fixing device and the image forming apparatus give effects similar to the above-described effects in the embodiments. Applying each of the embodiments of the present disclosure to the configuration enables maintaining the constant clearance between the surface of the fixing belt and the leading end of the separation plate and preventing the separation plate from being pushed into the surface of the fixing belt by using the existing member.

The above-described embodiments of the present disclosure have at least the following aspects.

[First Aspect]

In a first aspect, a fixing device includes a first rotator, a second rotator, a heater, a nip formation pad, and a separator. The second rotator contacts an outer circumferential surface of the first rotator to form a nip between the first rotator and the second rotator. The heater includes a resistive heat generator to heat the first rotator. The nip formation pad contacts an inner circumferential surface of the first rotator to form the nip. The separator separates a recording medium passing through the nip from the first rotator. The separator includes a separating surface and a contact. The separating surface is separated from the outer circumferential surface of the first rotator and separates the recording medium from the first rotator. The contact contacts the outer circumferential surface of the first rotator at a position where the first rotator is pinchable between the contact and the nip formation pad.

[Second Aspect]

In a second aspect, the contact portion in the fixing device according to the first aspect contacts a non-passing region of the outer circumferential surface of the first rotator, and the non-passing region is outside a maximum recording medium passing region.

[Third Aspect]

In a third aspect, the nip formation pad in the fixing device according to the first aspect or the second aspect holds the heater contacting the inner circumferential surface of the first rotator opposing the nip.

[Fourth Aspect]

In a fourth aspect, the heater in the fixing device according to the third aspect has a flat surface contacting the inner circumferential surface of the first rotator.

[Fifth Aspect]

In a fifth aspect, the heater in the fixing device according to the third aspect or the fourth aspect has a contacting surface contacting the first rotator, and the nip formation pad has a projection projected from the contacting surface of the heater toward the second rotator. The projection is downstream from a center of the nip in a medium passing direction in which the recording medium passes through the nip.

[Sixth Aspect]

In a sixth aspect, the nip formation pad in the fixing device according to any one of the first to fifth aspects has multiple guides and a contact surface contacting the inner circumferential surface of the first rotator opposing the nip, and the contact surface extends longer than one of the multiple guides in a longitudinal direction of the first rotator.

[Seventh Aspect]

In a seventh aspect, the contact in the fixing device according to any one of the first to sixth aspects contacts an outer region of the outer circumferential surface of the first rotator, and the outer region is outside the resistive heat generator in a longitudinal direction of the first rotator.

[Eighth Aspect]

In an eighth aspect, the second rotator in the fixing device according to any one of the first to seventh aspects rotates the first rotator.

[Ninth Aspect]

In a ninth aspect, the first rotator in the fixing device according to any one of the first to eighth aspects includes a base layer made of resin.

[Tenth Aspect]

In a tenth aspect, the fixing device according to any one of the first to ninth aspects further includes a pressing member and a pressure release mechanism. The pressing member brings the first rotator and the second rotator into pressure contact with each other. The pressure release mechanism releases the pressure contact between the first rotator and the second rotator.

[Eleventh Aspect]

In an eleventh aspect, the contact in the fixing device according to any one of the first to tenth aspects is made of an elastic material.

[Twelfth Aspect]

In a twelfth aspect, an outer diameter of the first rotator in the fixing device according to the first to eleventh aspects is larger than an outer diameter of the second rotator.

[Thirteenth Aspect]

In a thirteenth aspect, the fixing device according to any one of the first to twelfth aspects includes a pressing member to press the second rotator against the first rotator.

[Fourteenth Aspect]

In a fourteenth aspect, the plate in the fixing device according to any one of the first to thirteenth aspects has a leading end, and the leading end has a first clearance between the outer circumferential surface of the first rotator and the leading end of the plate at a center of the first rotator in a longitudinal direction of the first rotator and a second clearance between the outer circumferential surface of the first rotator and the leading end of the plate at both ends of the first rotator in the longitudinal direction, the second clearance being smaller than the first clearance.

[Fifteenth Aspect]

In a fifteenth aspect, the first rotator in the fixing device according to any one of the first to fourteenth aspects includes a base layer and a surface layer on an outer circumferential surface of the base layer.

[Sixteenth Aspect]

In a sixteenth aspect, the heater in the fixing device according to any one of the first to fifteenth aspects includes multiple resistive heat generators including the resistive heat generator, and the multiple resistive heat generators are arranged in a longitudinal direction of the first rotator.

[Seventeenth Aspect]

In a seventeenth aspect, an image forming apparatus includes the fixing device according to any one of the first to sixteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

a first rotator;

a second rotator contacting an outer circumferential surface of the first rotator to form a nip between the first rotator and the second rotator;

a heater including a resistive heat generator configured to heat the first rotator;

a nip formation pad contacting an inner circumferential surface of the first rotator to form the nip; and a separator configured to separate a recording medium passing through the nip from the first rotator, the separator including:

a separating surface separated from the outer circumferential surface of the first rotator and configured to separate the recording medium from the first rotator; and a contact contacting the outer circumferential surface of the first rotator at a position where the first rotator is pinchable between the contact and the nip information pad.

2. The fixing device according to claim 1, wherein the contact contacts a non-passing region of the outer circumferential surface of the first rotator, and the non-passing region is outside a maximum recording medium passing region through which the recording medium having the maximum width passes.

3. The fixing device according to claim 1, wherein the nip information pad holds the heater contacting the inner circumferential surface of the first rotator opposing the nip.

4. The fixing device according to claim 3, wherein the heater has a flat surface contacting the inner circumferential surface of the first rotator.

5. The fixing device according to claim 3, wherein the heater has a contacting surface contacting the first rotator, the nip formation pad has a projection projected from the contacting surface of the heater toward the second rotator, and the projection is downstream from a center of the nip in a medium passing direction in which the recording medium passes through the nip.

6. The fixing device according to claim 1, wherein the nip formation pad has:

multiple guides; and a contact surface contacting the inner circumferential surface of the first rotator opposing the nip, the contact surface extends longer than one of the multiple guides in a longitudinal direction of the first rotator.

7. The fixing device according to claim 1, wherein the contact contacts an outer region of the outer circumferential surface of the first rotator, and the outer region is outside the resistive heat generator in a longitudinal direction of the first rotator.

8. The fixing device according to claim 1, wherein the second rotator rotates the first rotator.

9. The fixing device according to claim 1, wherein the first rotator includes a base layer made of resin.

10. The fixing device according to claim 1, further comprising:

a pressing member configured to bring the first rotator and the second rotator into pressure contact with each other; and a pressure release mechanism configured to release the pressure contact between the first rotator and the second rotator.

11. The fixing device according to claim 1, wherein the contact is made of an elastic material.

12. The fixing device according to claim 1, wherein an outer diameter of the first rotator is larger than an outer diameter of the second rotator.

13. The fixing device according to claim 1, further comprising a pressing member configured to press the second rotator against the first rotator.

14. The fixing device according to claim 1, wherein the plate has a leading end, and the leading end has:

a first clearance between the outer circumferential surface of the first rotator and the leading end of the plate at a center of the first rotator in a longitudinal direction of the first rotator; and a second clearance between the outer circumferential surface of the first rotator and the leading end of the plate at both ends of the first rotator in the longitudinal direction, the second clearance being smaller than the first clearance.

15. The fixing device according to claim 1, wherein the first rotator includes:

a base layer; and a surface layer on an outer circumferential surface of the base layer.

16. The fixing device according to claim 1, wherein the heater includes multiple resistive heat generators including the resistive heat generator, and the multiple resistive heat generators are arranged in a longitudinal direction of the first rotator.

17. An image forming apparatus comprising the fixing device according to claim 1.

* * * * *